(12) United States Patent
Kikkawa et al.

(10) Patent No.: US 8,516,378 B2
(45) Date of Patent: Aug. 20, 2013

(54) INFORMATION PROCESSING DEVICE, INFORMATION PROCESSING METHOD, PROGRAM, INFORMATION PROVIDING DEVICE, AND INFORMATION PROCESSING SYSTEM

(75) Inventors: Norifumi Kikkawa, Tokyo (JP); Yasunori Nagatomo, Tokyo (JP); Masahiro Hara, Tokyo (JP); Atsushi Onoe, Kanagawa (JP)

(73) Assignee: Sony Corporation, Tokyo (JP)

( * ) Notice: Subject to any disclaimer, the term of this patent is extended or adjusted under 35 U.S.C. 154(b) by 212 days.

(21) Appl. No.: 13/090,956

(22) Filed: Apr. 20, 2011

(65) Prior Publication Data

US 2011/0271200 A1 Nov. 3, 2011

(30) Foreign Application Priority Data

Apr. 30, 2010 (JP) ................................ P2010-105471

(51) Int. Cl.
*G06F 3/00* (2006.01)

(52) U.S. Cl.
USPC ........................ 715/744; 715/745; 715/804

(58) Field of Classification Search
USPC .......................................... 715/744, 745, 804
See application file for complete search history.

(56) References Cited

U.S. PATENT DOCUMENTS

| | | | | |
|---|---|---|---|---|
| 6,424,360 | B1 * | 7/2002 | Torres | 715/810 |
| 7,099,948 | B2 * | 8/2006 | Tormasov et al. | 709/229 |
| 2002/0057295 | A1 * | 5/2002 | Panasyuk et al. | 345/804 |
| 2002/0130900 | A1 * | 9/2002 | Davis | 345/744 |
| 2003/0097358 | A1 * | 5/2003 | Mendez | 707/3 |
| 2004/0068735 | A1 * | 4/2004 | York et al. | 719/328 |
| 2004/0111398 | A1 * | 6/2004 | England et al. | 707/3 |
| 2004/0215706 | A1 * | 10/2004 | Lavender et al. | 709/201 |
| 2004/0261038 | A1 * | 12/2004 | Ording et al. | 715/792 |
| 2005/0080807 | A1 * | 4/2005 | Beilinson et al. | 707/102 |
| 2005/0183034 | A1 * | 8/2005 | Chitsaz et al. | 715/810 |
| 2005/0240983 | A1 * | 10/2005 | Peters | 726/1 |
| 2006/0005187 | A1 * | 1/2006 | Neil | 718/1 |
| 2006/0288097 | A1 * | 12/2006 | Sorrentino | 709/224 |
| 2007/0005727 | A1 * | 1/2007 | Edwards et al. | 709/218 |
| 2009/0031254 | A1 * | 1/2009 | Herpel et al. | 715/840 |
| 2009/0070405 | A1 * | 3/2009 | Mazzaferri | 709/202 |
| 2009/0070687 | A1 * | 3/2009 | Mazzaferri | 715/751 |
| 2009/0113507 | A1 * | 4/2009 | Gotcher et al. | 725/118 |
| 2009/0327892 | A1 * | 12/2009 | Douillet et al. | 715/717 |
| 2010/0042684 | A1 * | 2/2010 | Broms et al. | 709/204 |
| 2010/0179876 | A1 * | 7/2010 | Holte | 705/14.54 |
| 2011/0102675 | A1 * | 5/2011 | Jackson | 348/558 |
| 2011/0138314 | A1 * | 6/2011 | Mir et al. | 715/779 |
| 2012/0232899 | A1 * | 9/2012 | Koval | 704/239 |

* cited by examiner

*Primary Examiner* — Tuyetlien Tran

(74) *Attorney, Agent, or Firm* — Finnegan, Henderson, Farabow, Garrett & Dunner, L.L.P.

(57) ABSTRACT

Systems and methods for controlling presentation of a menu over a network are disclosed. In one embodiment, an information processing apparatus has a communication unit configured to communicate with an information-providing apparatus over the network, an input unit configured to receive input from a user of the information-processing apparatus, a storage unit storing one or more menus, and a control unit. The control unit is configured to receive, via the input unit, a selection of information for processing, to retrieve, from the storage unit, a first menu associated with the selected information, to receive, via the communication unit, a second menu associated with the selected information from the information-providing apparatus over the network, and to generate a third menu associated with the selected information based on the first menu and on the second menu.

14 Claims, 25 Drawing Sheets

FIG.8

| USE CASE | MEANING OF PROVIDED OPERATION LIST (OL) |
|---|---|
| Content Operation | OPERATION MENU RELATED TO EACH CONTENT PROVIDED BY DLNA DMS |
| Media Operation | OPERATION MENU RELATED TO CONTENT SET TO DLNA DMS |

FIG.9

| USE CASE | REMOTE OPERATION (RO) COMPATIBILITY CHECK | ACQUISITION OF OPERATION LIST (OL) | OPERATION EXECUTION |
|---|---|---|---|
| Content Operation | CDS::Browse() av:msOpList | CDS::X_GetOperationList() | CDS::X_ExecuteOperation() |
| Media Operation | AVT::GetPositionInfo() av:mrOpList | AVT::X_GetOperationList() | AVT::X_ExecuteOperation() |

FIG.10

| operation type | description |
|---|---|
| common | BASIC SPECIFICATION ONLY |
| bivl | OPTION SUPPORTED BY BIVL-COMPATIBLE EQUIPMENT |

FIG.11

| Name | Content Operation | Media Operation |
|---|---|---|
| av:msOpList | R | |
| av:mrOpList | | R |

FIG.12

| Name | Content Operation | Media Operation |
|---|---|---|
| CDS:X_GetOperationList | R | |
| CDS:X_ExecuteOperation | R | |
| AVT:X_GetOperationList | | R |
| AVT:X_ExecuteOperation | | R |

FIG.13

| Name | Data type | Mulit-Valued | Description |
|---|---|---|---|
| av:msOpList | CSV of String (WITHIN 1024 BYTES IN TOTAL) | No | INDICATES THAT OPERATION LIST IS ACQUIRABLE IN TARGET OBJECT OPERATION TYPES POSSIBLY INCLUDED IN THE OPERATION LIST ARE LISTED IN CSV ex. <av:msOpList>common,bi\/</av:msOpList> |
| av:mrOpList | CSV of String (WITHIN 1024 BYTES IN TOTAL) | No | INDICATES THAT OPERATION LIST IS ACQUIRABLE IN TARGET OBJECT (SET TO MEDIA RENDERER) OPERATION TYPES POSSIBLY INCLUDED IN THE OPERATION LIST ARE LISTED IN CSV NOTE: USED ONLY ON AVT AND NOT USED ON CDS |

FIG.14

| Variable Name | Data Type |
|---|---|
| X_A_ARG_TYPE_OperationList | String (escaped XML) |
| X_A_ARG_TYPE_ActionDirective | String |
| X_A_ARG_TYPE_ROPResult | String (escaped XML) |

FIG.15

| Name |
|---|
| CDS:X_GetOperationList |
| CDS:X_ExecuteOperation |
| AVT:X_GetOperationList |
| AVT:X_ExecuteOperation |

FIG.16

| Name | Direction | relatedStateVariable |
|---|---|---|
| ObjectID | IN | A_ARG_TYPE_ObjectID |
| OperationList | OUT | X_A_ARG_TYPE_OperationList |

FIG.17

| errorCode | errorDescription | Description |
|---|---|---|
| 701 | No such object | The specified ObjectID is invalid. |
| 805 | No OperationList | The object does NOT have OperationList. |

FIG.18

| Name | Direction | relatedStateVariable |
|---|---|---|
| ObjectID | IN | A_ARG_TYPE_ObjectID |
| ActionDirective | IN | X_A_ARG_TYPE_ActionDirective |
| Result | OUT | X_A_ARG_TYPE_ROPResult |
| UpdateID | OUT | A_ARG_TYPE_UpdateID |

FIG.19

| errorCode | errorDescription | Description |
|---|---|---|
| 701 | No such object | The specified ObjectID is invalid. |
| 805 | No OperationList | The object does NOT have OperationList. |
| 806 | Invalid ActionDirective | The specified ActionDirective is invalid. |

FIG.20

| Name | Direction | relatedStateVariable |
|---|---|---|
| AVTInstanceID | IN | A_ARG_TYPE_InstanceID |
| OperationList | OUT | X_A_ARG_TYPE_OperationList |

FIG.21

| errorCode | errorDescription | Description |
|---|---|---|
| 718 | Invalid InstanceID | The specified AVT Instance ID is invalid. |
| 805 | No OperationList | The instance does NOT have OperationList. |

FIG.22

| Name | Direction | relatedStateVariable |
|---|---|---|
| AVTInstanceID | IN | A_ARG_TYPE_InstanceID |
| ActionDirective | IN | X_A_ARG_TYPE_ActionDirective |
| Result | OUT | X_A_ARG_TYPE_ROPResult |

FIG.23

| errorCode | errorDescription | Description |
|---|---|---|
| 718 | Invalid InstanceID | The specified AVT Instance ID is invalid. |
| 805 | No OperationList | The object does NOT have OperationList. |
| 806 | Invalid ActionDirective | The specified ActionDirective is invalid. |

FIG.24

```
<?xml version="1.0"?>
<oplist xmlns="urn:schemas-sony-com:av:ropoplist">
    <operation type="[type of the operation]">
        <displayString>[operation name for UI]</displayString>
        <shortDisplayString>[short operation name for UI]</shortDisplayString>
        <selected/>
        <confirm/>
        <iconUrl profile="JPEG_TN">[url for operation icon]</iconUrl>
        <action ropOnly="1">[action directive]</action>
        <parameterList>
            <parameter>
                <displayString>[parameter name for UI]</displayString>
                <shortDisplayString>[short parameter name for UI]</shortDisplayString>
                <selected/>
                <confirm/>
                <iconUrl profile="JPEG_TN">[url for parameter icon]</iconUrl>
                <action ropOnly="1">[action directive]</action>
            </parameter>
            // other parameters may go here.
        </parameterList>
    </operation>
    // other operations may go here.
</oplist>
```

D11

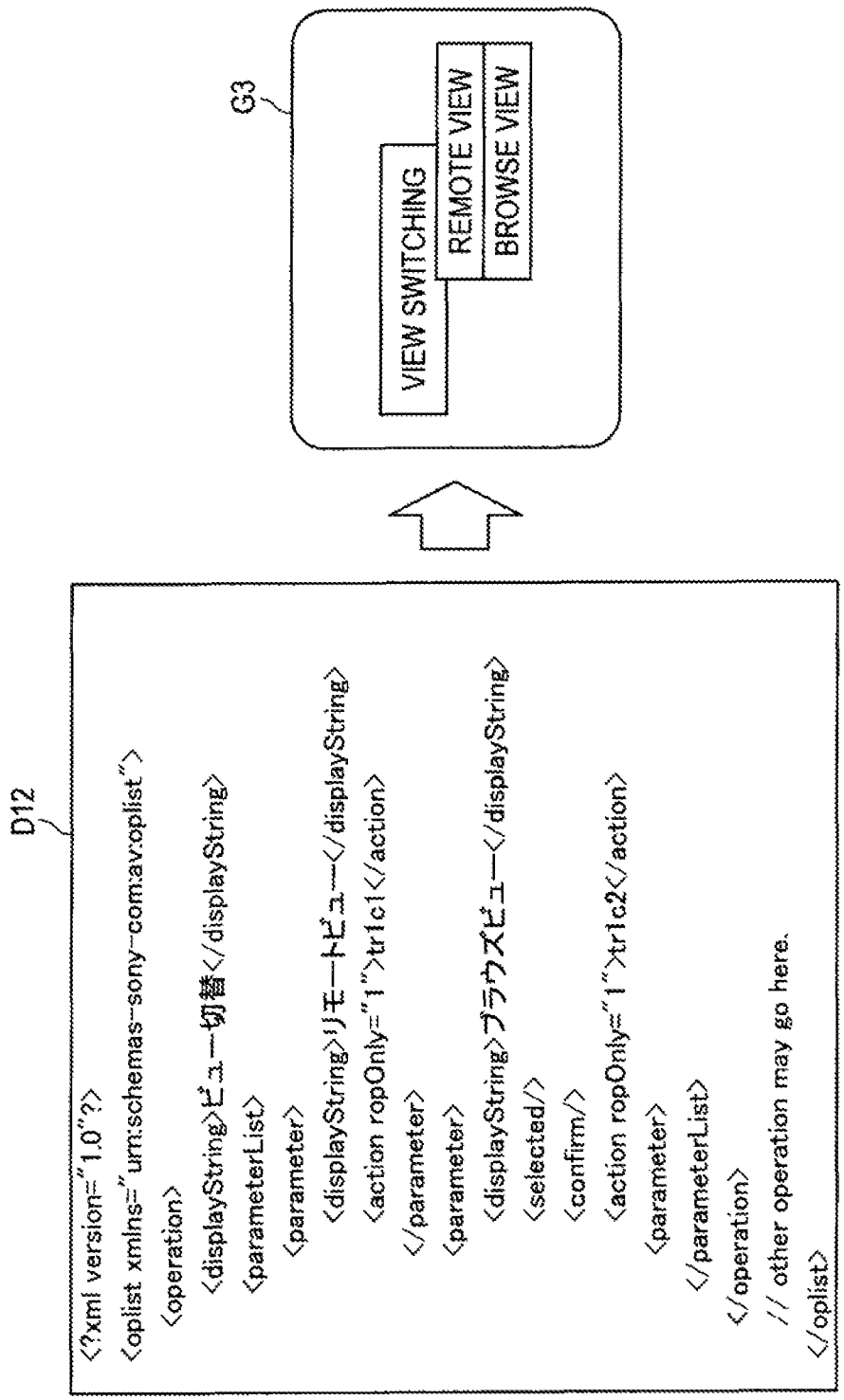

FIG.26

```
<?xml version="1.0"?>
<action xmlns="urn:schemas-sony-com:av:ropactiondirective">
    <name>{name of SOAP action}</name>
    <argumentList>
        <{name of argument1 of the SOAP action}>{value of the argument}<{...}>
        // other arguments may go here.
    </argumentList>
</action>
```
D21

FIG.27

```
<?xml version="1.0"?>
<result xmlns="urn:schemas-sony-com:av:ropresult">
    <message>{message text}</message>
    // other result information may go here.
</result>
```
D31

FIG.28

```
<Result>
    <result>
        <message>NO EQUIPMENT CONNECTED</message>
        <bivl1>···</bivl1>
    </result>
</Result>
```
D32

FIG.31

| CONTENT TYPE | MENU ITEM |
|---|---|
| CONTAINER | OPEN, DETAIL DISPLAY |
| VIDEO | PLAY, DETAIL DISPLAY |
| STILL PICTURE | PLAY, DETAIL DISPLAY |
| MUSIC | PLAY, DETAIL DISPLAY, RATING CHANGE (1-3) |

FIG.32

| OWN MENU ITEM | Network API |
|---|---|
| OPEN | HTTP GET |
| DETAIL DISPLAY | Browse |
| RATING CHANGE (1) | UpdateObject<br>(ObjID, <av:rating>old-value</av:rating>, <av:rating>1</av:rating>) |
| RATING CHANGE (2) | UpdateObject<br>(ObjID, <av:rating>old-value</av:rating>, <av:rating>2</av:rating>) |
| RATING CHANGE (3) | UpdateObject<br>(ObjID, <av:rating>old-value</av:rating>, <av:rating>3</av:rating>) |

FIG.33

| ROP MENU | Network API |
|---|---|
| SAVE TO FAVORITES | – (NO RELEVANT API) |
| RATE: ★ | UpdateObject<br>(ObjID,<av:rating>old-value</av:rating>, <av:rating>1</av:rating>) |
| RATE: ★★ | UpdateObject<br>(ObjID,<av:rating>old-value</av:rating>, <av:rating>2</av:rating>) |
| RATE: ★★★ | UpdateObject<br>(ObjID,<av:rating>old-value</av:rating>, <av:rating>3</av:rating>) |

FIG.36

```
D41
<?xml version="1.0"?>
<result xmlns="urn:schemas-sony-com:av:ropresult">
    <message label="1">{message text}</message>
    // other result information may go here.
</result>
```

FIG.37

| label attribute value | TYPE OF MESSAGE |
|---|---|
| 0 (OR NO LABEL) | Information |
| 1 | Success message |
| 2 | Error message |
| 3 | Warning message |

INFORMATION PROCESSING DEVICE, INFORMATION PROCESSING METHOD, PROGRAM, INFORMATION PROVIDING DEVICE, AND INFORMATION PROCESSING SYSTEM

PRIORITY APPLICATION

The present application claims the benefit of priority to Japanese Priority Patent Application JP 2010-105471 filed in the Japan Patent Office on Apr. 30, 2010, which is expressly incorporated herein by reference in its entirety.

BACKGROUND

1. Technical Field

The present disclosure relates to an information processing device, an information processing method, a program, an information providing device, and an information processing system.

2. Description of the Related Art

In recent years, a client-server system in which a client (which is also referred to hereinafter as an "information processing device") and a server (hereinafter as an "information providing device") share the role of a computer is used in various situations. In the client-server system, a user inputs a desired command to the client with looking at the screen, and the client transmits a request corresponding to the command input by the user to the server. The server receives the request transmitted from the client, executes an operation corresponding to the request, and transmits a result obtained by the execution as a response to the request back to the client.

The screen to be displayed on the client is broadly classified into the one created by the server and the one created by the client. The technique that creates the screen to be displayed on the client by the server includes a technique that creates a Web screen by a Web server, a technique that creates a screen to be delivered to electronic equipment such as a television by an IPTV (Internet Protocol TeleVision) server, a technique that creates a screen to be displayed on a computer at hand by a computer being operated in a remote desktop (cf. e.g. Japanese Unexamined Patent Application Publication No. 2007-219790) and so on, for example.

Further, the technique that creates the screen to be displayed on the client by the client itself includes a technique that creates a screen by a client operating in conformity with a protocol such as DLNA (Digital Living Network Alliance) and so on, for example.

SUMMARY

However, the technique that creates a screen to be displayed on the client by the server has an issue that compatibility between the screen prestored in the client and the screen created by the server is not favorable in some cases. The technique further has an issue that the displayed screen is made uniform among clients, and variations of the screen to be displayed by the screen are reduced.

On the other hand, the technique that creates the screen to be displayed on the client by the client itself has an issue that, when a protocol used between the server and the client changes, for example, it is necessary to change the function of creating the screen by the client in accordance with the protocol after change.

In light of the foregoing, it is desirable to provide a novel and improved technique capable of solving the problem of compatibility between the screen prestored in the client and the screen created by the server and flexibly responding to a change in the protocol used between the server and the client.

According to exemplary embodiments of the disclosed subject matter described above, it is possible to solve the problem of compatibility between the screen prestored in the client and the screen created by the server and flexibly respond to a change in the protocol used between the server and the client.

One aspect of the disclosure relates to an information-processing apparatus for controlling presentation of a menu over a network. The information processing apparatus may include a communication unit configured to communicate with an information-providing apparatus over the network, an input unit configured to receive input from a user of the information-processing apparatus, a storage unit storing one or more menus, and a control unit. The control unit may be configured to receive, via the input unit, a selection of information for processing, to retrieve, from the storage unit, a first menu associated with the selected information, to receive, via the communication unit, a second menu associated with the selected information from the information-providing apparatus over the network, and to generate a third menu associated with the selected information based on the first menu and on the second menu.

Another aspect relates to a computer-implemented method for controlling presentation of a menu over a network. The method may include receiving a selection of information for processing, accessing a first menu associated with the selected information, the first menu stored at an information-processing apparatus, and receiving, from an information-providing apparatus over the network, a second menu associated with the selected information. The method may further include generating a third menu associated with the selected information based on the first menu and on the second menu.

Another aspect relates to a non-transitory computer-readable storage medium storing instructions which, when executed by an information-processing apparatus, cause the information-processing apparatus to perform a method for controlling presentation of a menu over a network. The method may include receiving a selection of information for processing, accessing a first menu associated with the selected information, the first menu stored at an information-processing apparatus, and receiving, from an information-providing apparatus over the network, a second menu associated with the selected information. The method may further include generating a third menu associated with the selected information based on the first menu and on the second menu.

Another aspect relates to an information-providing apparatus for controlling the presentation of a menu over a network. The information-providing apparatus may include a communication unit configured to communicate with an information-processing apparatus over the network, a storage unit storing one or more menus, and a control unit. The control unit may be configured to receive, via the communication unit, a selection of information for processing, to retrieve, from the storage unit, a first menu associated with the selected information to be combined with a second menu associated with the selected information, the second menu being stored at the information-processing apparatus, and to send, via the communication unit, the retrieved first menu to the information-processing apparatus over the network. The information processing apparatus may generate a third menu associated with the selected information by combining the first menu and the second menu.

Yet another aspect relates to a method for controlling the presentation of a menu over a network. The method may include receiving, at an information-providing apparatus, a selection of information for processing from an information-processing apparatus over the network, retrieving, from a storage unit at the information-providing apparatus, a first menu associated with the selected information to be combined with a second menu associated with the selected information, the second menu being stored at the information-processing apparatus. The method may further include sending the retrieved first menu to the information-processing apparatus over the network. The information processing apparatus may then generate a third menu associated with the selected information by combining the first menu and the second menu.

Finally, another aspect relates to a non-transitory computer-readable storage medium storing instructions which, when executed by an information-providing apparatus, cause the information-providing apparatus to perform a method for controlling the presentation of a menu over a network. The method may include receiving, at the information-providing apparatus, a selection of information for processing from an information-processing apparatus over the network, retrieving, from a storage unit at the information-providing apparatus, a first menu associated with the selected information to be combined with a second menu associated with the selected information, the second menu being stored at the information-processing apparatus, and sending the retrieved first menu to the information-processing apparatus over the network

BRIEF DESCRIPTION OF THE DRAWINGS

FIG. 8 is a view showing meaning of menu items transmitted from the information providing device according to the embodiment with respect to each use case;

FIG. 9 is a view showing commands executed by the information processing device according to the embodiment with respect to each use case;

FIG. 10 is a view to explain an operation type indicating whether an extended definition of a remote operation according to the embodiment is used;

FIG. 11 is a view showing whether each property is necessary to support each use case to which the information processing system according to the embodiment is applied;

FIG. 12 is a view showing whether each command is necessary to support each use case to which the information processing system according to the embodiment is applied;

FIG. 13 is a view to explain each property used in the information processing system according to the embodiment;

FIG. 14 is a view to explain each variable used in the information processing system according to the embodiment;

FIG. 15 is a view to explain each command used in the information processing system according to the embodiment;

FIG. 16 is a view to explain an argument and a returned value of a command (first command) used in the information processing system according to the embodiment;

FIG. 17 is a view to explain types of the returned value of the command (first command) used in the information processing system according to the embodiment;

FIG. 18 is a view to explain an argument and a returned value of a command (second command) used in the information processing system according to the embodiment;

FIG. 19 is a view to explain types of the returned value of the command (second command) used in the information processing system according to the embodiment;

FIG. 20 is a view to explain an argument and a returned value of a command (third command) used in the information processing system according to the embodiment;

FIG. 21 is a view to explain types of the returned value of the command (third command) used in the information processing system according to the embodiment;

FIG. 22 is a view to explain an argument and a returned value of a command (fourth command) used in the information processing system according to the embodiment;

FIG. 23 is a view to explain types of the returned value of the command (fourth command) used in the information processing system according to the embodiment;

FIG. 24 is a view showing an example of description of an acquisition response transmitted by the information providing device according to the embodiment;

FIG. 25 is a view showing an example of description and an example of display of an acquisition response transmitted by the information processing device according to the embodiment;

FIG. 26 is a view showing an example of description of an execution request containing operation identification information selected by the information processing device according to the embodiment;

FIG. 27 is a view (first view) showing an example of description of an execution response transmitted by the information providing device according to the embodiment;

FIG. 28 is a view (second view) showing an example of description of an execution response transmitted by the information providing device according to the embodiment;

FIG. 31 is a view showing information for specifying a menu item to be displayed from types of contents by the information processing device according to the embodiment;

FIG. 32 is a view showing information for specifying a command to be executed from menu items prestored in the information processing device according to the embodiment;

FIG. 33 is a view showing information for specifying a command to be executed from menu items transmitted from the information providing device according to the embodiment;

FIG. 36 is a view showing an example of description of an execution response containing a message with a label indicating a type of the message; and FIG. 37 is a view showing an example of correspondence between a type of a message and a value of a label.

DETAILED DESCRIPTION OF THE EMBODIMENT(S)

Figure 1:
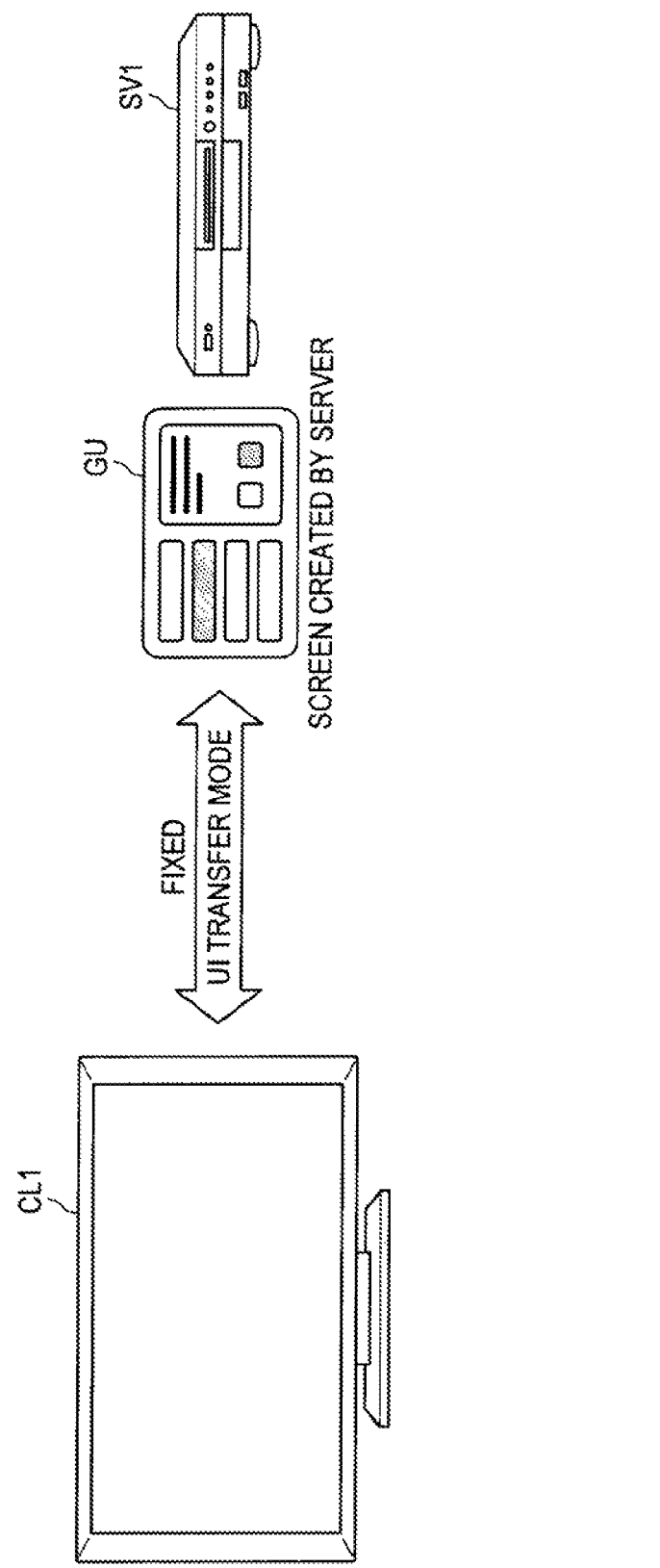
FIG. 1 is a view to explain a client-server system in which a server creates a screen.

Hereinafter, exemplary embodiments consistent with the present disclosure will be described in detail with reference to the appended drawings. Note that, in this specification and the appended drawings, structural elements that have substantially the same function and structure are denoted with the same reference numerals, and repeated explanation of these structural elements is omitted.

Exemplary embodiments will be described hereinafter in the following order.

1. Embodiment
1-1. Client-Server System in which Server Creates Screen
1-2. Client-Server System in which Client Creates Screen
1-3. Example of Display of Screen Prestored in Client
1-4. Example of Display of Screen Created by Integrating Menu Items
1-5. Overview of Functions of Information Processing Device
1-6. Functional Configuration of Information Providing Device
1-7. Functional Configuration of Information Processing Device
1-8. Meaning of Menu Item Transmitted from Information Providing Device
1-9. Command Executed by Information Processing Device
1-10. Operation Type Indicating whether Extended Definition is Used
1-11. Property Necessary to Support Each Use Case
1-12. Command Necessary to Support Each Use Case
1-13. Each Property Used in Information Processing System
1-14. Variable Used in Information Processing System
1-15. Command Used in Information Processing System
1-16. Argument and Returned Value of First Command
1-17. Type of Returned Value of First Command
1-18. Argument and Returned Value of Second Command
1-19. Type of Returned Value of Second Command
1-20. Argument and Returned Value of Third Command
1-21. Type of Returned Value of Third Command
1-22. Argument and Returned Value of Fourth Command
1-23. Type of Returned Value of Fourth Command
1-24. Example of Description of Acquisition Response
1-25. Example of Description and Example of Display of Acquisition Response
1-26. Example of Description of Execution Request
1-27. First Example of Description of Execution Response
1-28. Second Example of Description of Execution Response
1-29. First Example of Application of Information Processing System
1-30. Second Example of Application of Information Processing System
1-31. Information for Specifying Menu Item from Type of Content
1-32. Correspondence between Menu Item Stored in Information Processing Device and Command
1-33. Correspondence between Menu Item Transmitted from Information Providing Device and Command
1-34. Flow of Process Executed by Information Processing Device
1-35. Combination of Menu Items
1-36. Execution Response Containing Message with Label
1-37. Correspondence between Type of Message and Value of Label
2. Alternative Example
3. Summary

1. Embodiment

1-1. Client-Server System in which Server Creates Screen

FIG. 1 is a view to explain a client-server system in which a server creates a screen. Referring to FIG. 1, in the client-server system, a screen GU displayed on a client CL1 is created by a server SV1. When the screen is transmitted from the server SV1 to the client CL1, a fixed UI (User Interface) transfer mode is used. Examples of such a client-server system include a system in which a Web server creates a Web screen, a system in which an IPTV server creates a screen to be delivered to electronic equipment such as a television, a system in which a computer being operated in a remote desktop creates a screen to be displayed on a computer at hand and so on, for example.

Such a system has a property that compatibility between a screen created by a function of screen display inherent to the client CL1 and a screen created by the server SV1 is not favorable. Further, the system has a property that differentiation from another client is not made for display of a screen created by the server SV1.

1-2. Client-Server System in which Client Creates Screen

Figure 2:
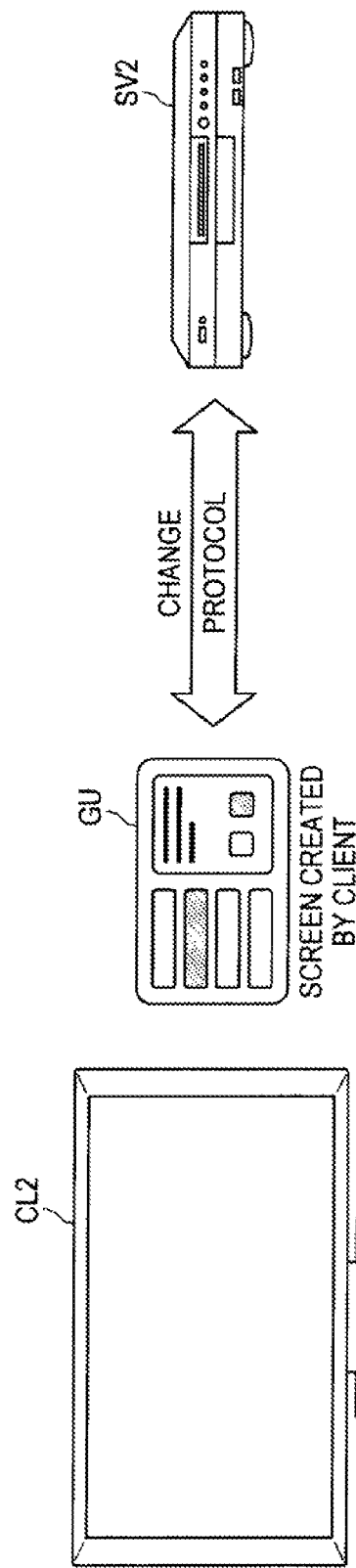
FIG. 2 is a view to explain a client-server system in which a client creates a screen.

FIG. 2 is a view to explain a client-server system in which a client creates a screen. Referring to FIG. 2, in the client-server system, a screen GU displayed on a client CL2 is created by the client CL2 itself. A protocol used for communication between the client CL2 and a server SV2 varies. Examples of such a client-server system include a system in which the client CL2 operating in conformity with a protocol such as DLNA creates a screen and so on, for example.

Such a system has a property that, when a protocol used between the server SV2 and the client CL2 changes, it is necessary to change the function of creating the screen by the client CL2 in accordance with the protocol after change.

In this specification, an information processing system that does not have such properties of the client-server system in which the server creates a screen and the client-server system in which the client creates a screen.

1-3. Example of Display of Screen Prestored in Client

Figure 3:
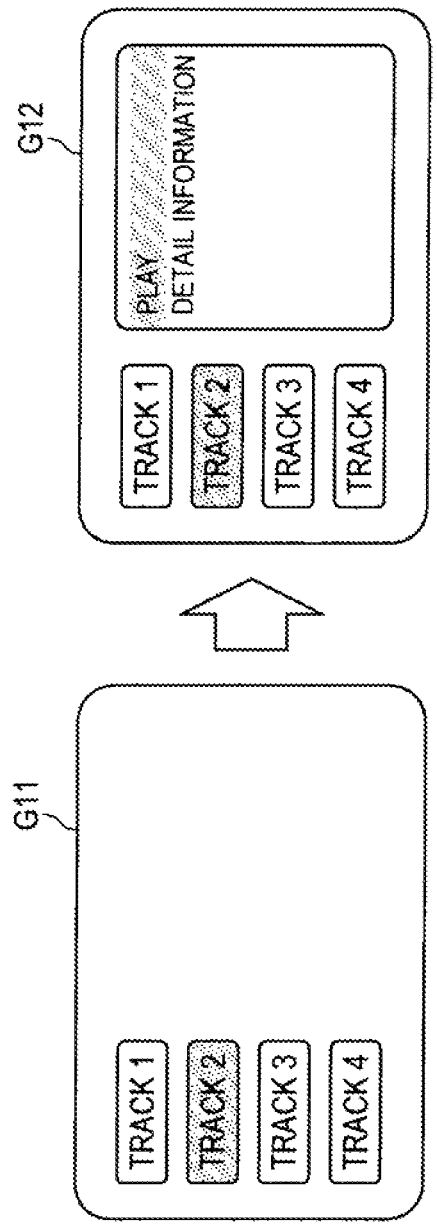
FIG. 3 is a view showing an example of display of a screen prestored in a client.

FIG. 3 is a view showing an example of display of a screen prestored in a client. On a screen G11 which is prestored in the client, buttons (buttons "track 1" to "track 4") indicating contents are set, and focus is placed on "track 2".

In the state where the focus is placed on "track 2", when a command for selecting a content on which the focus is placed is given to the client, operation specific information (which is also referred to hereinafter as a "menu item") which are executable for a content corresponding to "track 2" are displayed within a window of a screen G12. In the example shown in FIG. 3, "play" and "detail information" are displayed as the operation specific information executable for a content corresponding to "track 2".

Hereinafter, various kinds of information contained in a request or a response is set to a predetermined position in the request or the response specified for each type of information by a transmission source device and acquired from the predetermined position by a transmission destination device.

1-4. Example of Display of Screen Created by Integrating Menu Items

Figure 4:
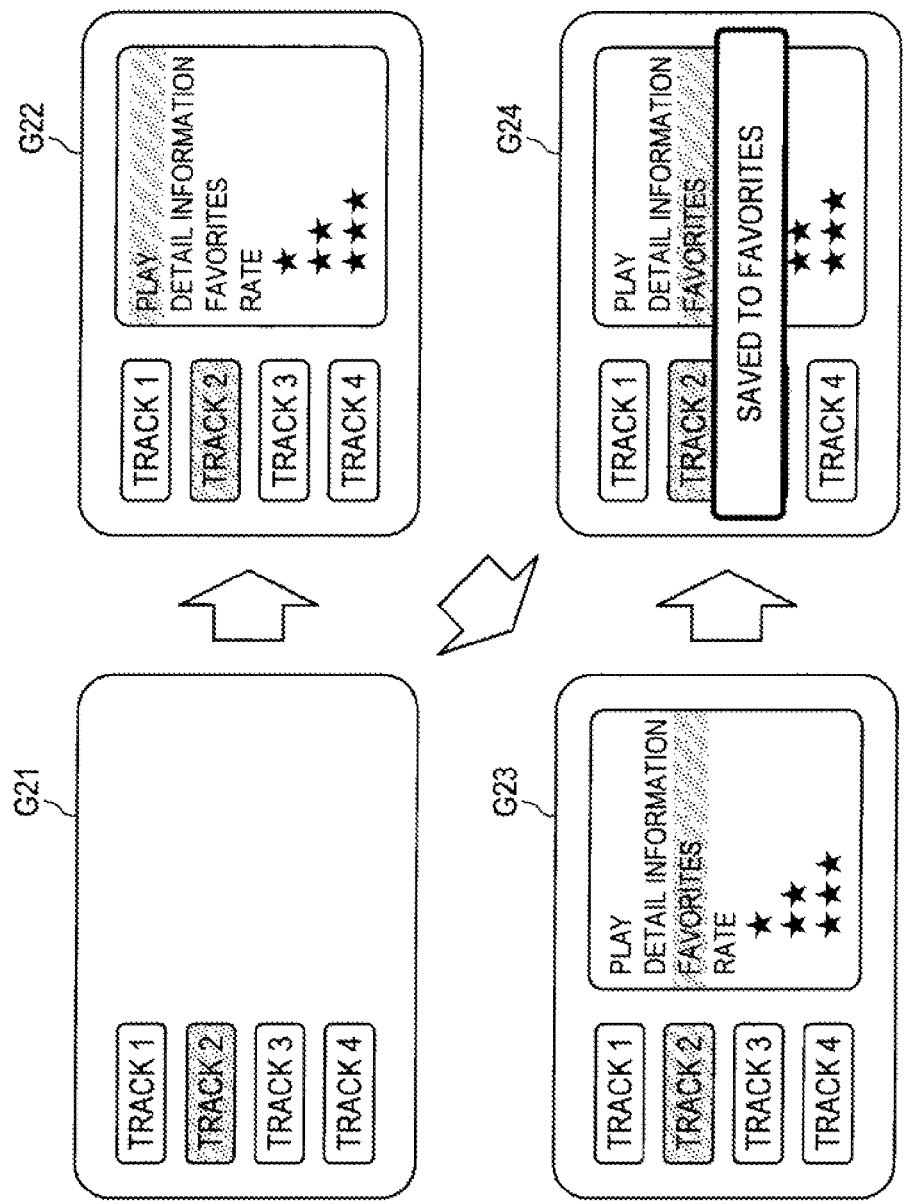
FIG. 4 is a view showing an example of display of a screen created by integrating menu items prestored in an information processing device according to an embodiment and menu items received from an information providing device.

FIG. 4 is a view showing an example of display of a screen created by integrating menu items prestored in an information processing device according to an embodiment and menu items received from an information providing device. Referring to FIG. 4, on a screen G21 which is prestored in the information providing device 200, buttons (buttons "track 1" to "track 4") indicating contents are set, and focus is placed on "track 2".

In the state where the focus is placed on "track 2", when a command for selecting a content on which the focus is placed is given to the information processing device 200, menu items which are executable for a content corresponding to "track 2" are displayed within a window of a screen G22. In the example shown in FIG. 4, "play", "detail information", "favorites" and "rate" are displayed as the menu items executable for a content corresponding to "track 2". Of those menu items, "play" and "detail information" are menu items prestored in the information processing device 200, and "favorites" and "rate" are menu items received from the information providing device 100.

In the state where the focus is placed on "track 2", when a command for shifting the focus among menu items is given to the information processing device 200, the focus shifts within a window of a screen G23, and the focus is placed on the menu item "favorites". In the state where the focus is placed on "track 2" and "favorites", when a command for executing the operation is given to the information processing device 200, processing for saving a content corresponding to "track 2" to "favorites" is executed. Then, on a screen G24, a message "saved to favorites" is displayed.

As described above, in this embodiment, the information processing device 200 displays the screen created by integrating the prestored menu items and the menu items received from the information providing device 100 based on screen information held in its own device. The information processing device 200 uses prestored information as the screen information such as display positions of menu items and uses both prestored information and information received from the information processing device 100 as the menu items.

In this manner, prestored menu items and menu items received from the information providing device 100 can be displayed in compatibility. Such a technique is referred to hereinafter as ROP (Remote OPeration). Further, the information processing device 200 is referred to as an ROP client, and the information providing device 100 is referred to as an ROP server, occasionally.

1-5. Overview of Functions of Information Processing System

Figure 5:
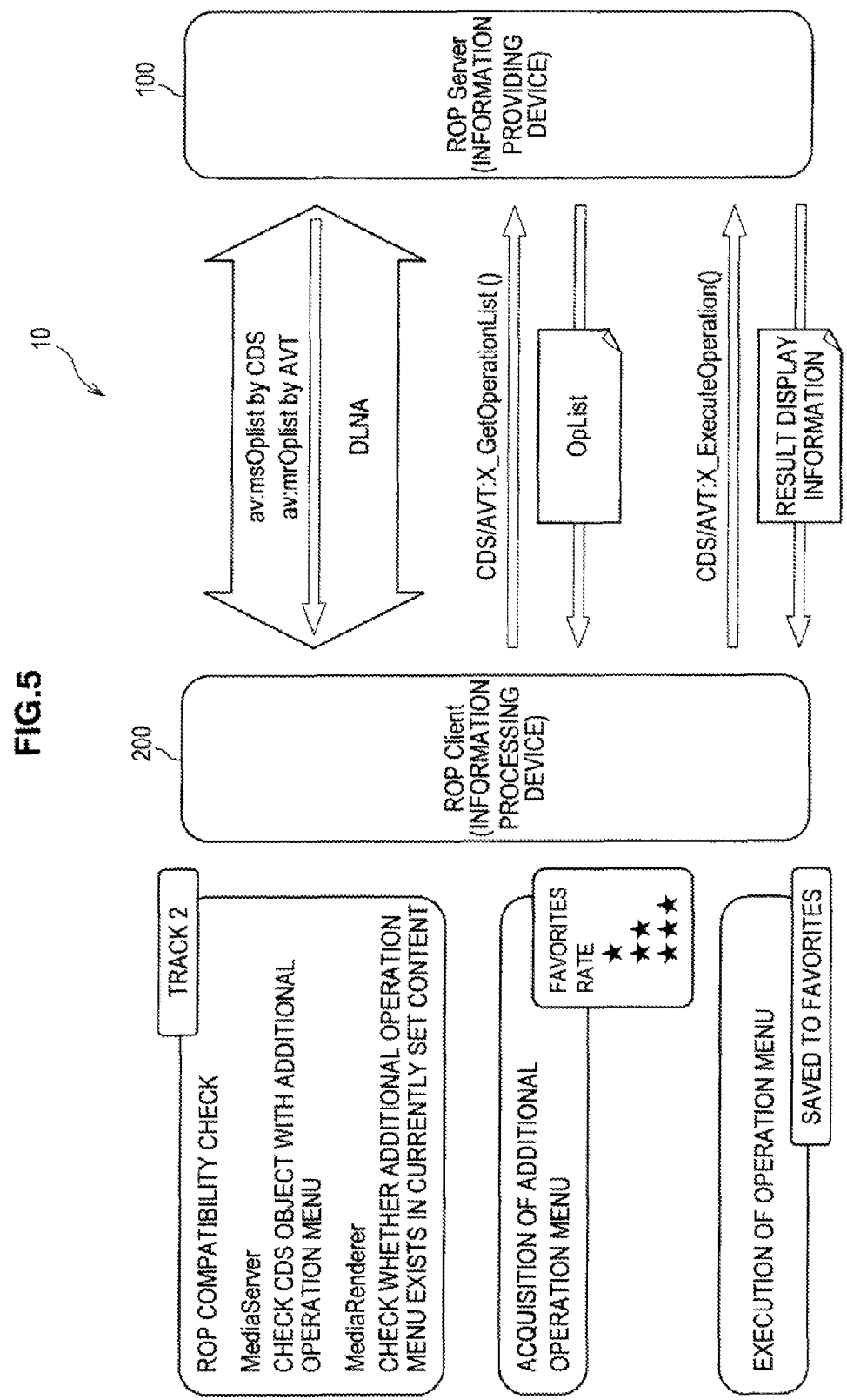
FIG. 5 is a view to explain an overview of functions of an information processing system according to the embodiment.

FIG. 5 is a view to explain an overview of functions of an information processing system according to the embodiment. Referring to FIG. 5, an information processing system 10 includes the information providing device 100 and the information processing device 200. The information providing device 100 and the information processing device 200 exist within the same home network, for example, and the information providing device 100 serves as DMS (Digital Media Server) and the information processing device 200 serves as DMP (Digital Media Player), for example. Specifically, the information processing device 200 acquires a content and a content list from the information providing device 100 in conformity with DLNA (Digital Living Network Alliance).

Further, the information providing device 100 may serve as DMS, and the information processing device 200 may serve as DMR (Digital Media Renderer). This is described later with reference to FIGS. 29 and 30. Types of contents may be music data, video data, text data or the like, although not particularly limited.

Referring to FIG. 5, the information processing system 10 executes processing in the sequence of ROP compatibility check, acquisition of an additional operation menu, and execution of an operation menu. In the above description, the additional operation menu means a menu item received from the information providing device 100. For example, in the ROP compatibility check, when the information providing device 100 serves as DMS, the information processing device 200 checks a CDS object (content) with an additional operation menu by using CDS (Content Directory Service) provided from the information providing device 100. Further, in the ROP compatibility check, when the information providing device 100 serves as DMR, for example, the information processing device 200 checks whether there is an additional operation menu in a content currently set to the information providing device 100.

Next, the information processing device 200 acquires the additional operation menu for the content with the additional operation menu. Then, the information processing device 200 executes an operation menu.

When the information providing device 100 serves as DMS, the information processing device 200 acquires metadata of a content by a command "CDS:Browse( )", for example, and performs ROP compatibility check depending on whether "av:msOplist" is contained as the metadata. When the information providing device 100 serves as DMR, the information processing device 200 acquires metadata of the currently set content by a command "AVT:GetPositionInfo( )", for example, and performs ROP compatibility check depending on whether "av:mrOplist" is contained as the metadata.

Further, when the information providing device 100 serves as DMS, the information processing device 200 acquires an additional operation menu by a command "CDS:X_GetOperationList( )", for example. When the information providing device 100 serves as DMR, the information processing device 200 acquires an additional operation menu by a command "AVT:X_GetOperationList( )", for example. The additional operation menu is sent from the information providing device 100 to the information processing device 200 as "OpList", for example.

Further, when the information providing device 100 serves as DMS, the information processing device 200 executes an operation menu by a command "CDS:X_ExecuteOperation( )", for example. When the information providing device 100 serves as DMR, the information processing device 200 executes an operation menu by a command "AVT:X_ExecuteOperation( )", for example. An execution result of the operation menu is sent from the information providing device 100 to the information processing device 200 as "result display information", for example.

1-6. Functional Configuration of Information Providing Device

Figure 6:
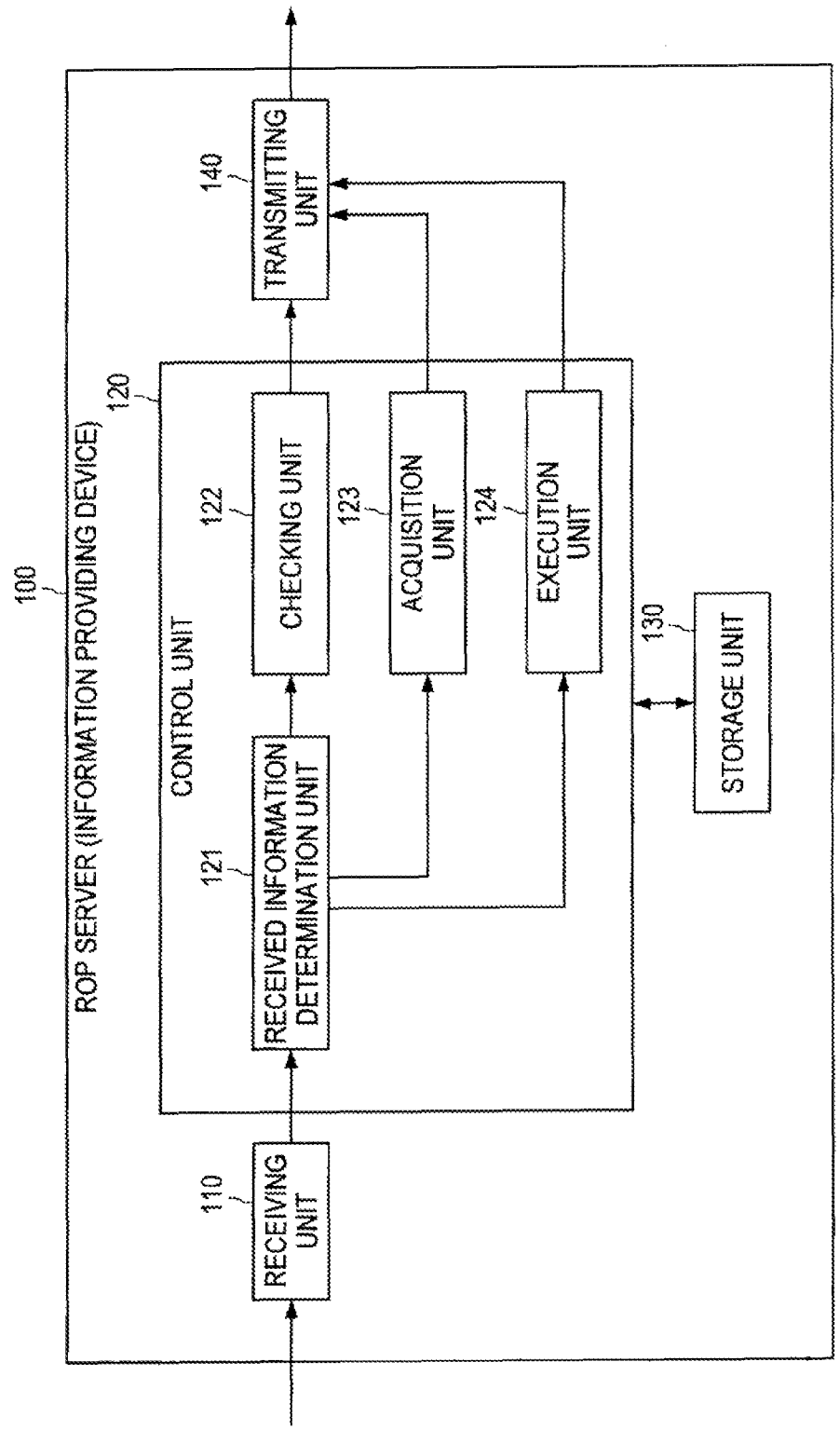
FIG. 6 is a view showing a functional configuration of an information providing device according to the embodiment.

FIG. 6 is a view showing a functional configuration of an information providing device according to the embodiment.

The information providing device 100 at least includes a storage unit 130, a transmitting unit 140, a receiving unit 110, and an execution unit 124.

The storage unit 130 has a function of storing first operation specific information indicating a specific detail of a first operation to be executed by the information providing device 100 and storing first operation identification information for identifying the first operation. In the above example, the first operation is an operation that saves a content to favorites, an operation that changes the rate of a content or the like, the first operation specific information is a character string "favorites", "rate" or the like, and the first operation identification information is information for identifying processing to save a content to favorites, information for identifying an operation to change the rate of a content or the like. The storage unit 130 may be a storage device such as HDD or semiconductor memory, for example.

The transmitting unit 140 has a function of transmitting the first operation specific information and the first operation identification information stored in the storage unit 130 to the information processing device 200. The transmitting unit 140 may be a communication device, for example, and serves as a communication interface with the information processing device 200.

The receiving unit 110 has a function of receiving an execution request which contains selected operation identification information after either one of the first operation identification information or second operation identification information indicating a specific detail of a second operation is selected as the selected operation identification information by the information processing device 200. In the above example, the second operation is an operation that plays a content, an operation that displays detail information of a content or the like, and the second operation specific information a character string "play", "detail information" or the like, and the second operation identification information is information for identifying an operation to play a content, information for identifying an operation to display detail information of a content or the like. The receiving unit 110 may be a communication device, for example, and serves as a communication interface with the information processing device 200.

The execution unit 124 has a function of executing the operation identified by the selected operation identification information contained in the execution request received by the receiving unit 110. The execution request is received by execution of a command "CDS:X_ExecuteOperation( )" or "AVT: X_ExecuteOperation( )" by the information processing device 200. For example, when the selected operation identification information contained in the execution request received by the receiving unit 11 is information for identifying the operation to play a content, the execution unit 124 executes the operation of playing a content, which is the operation identified by the identification information.

The information providing device 100 may further include a checking unit 122. The checking unit 122 has a function of, as a response to a check request received by the receiving unit 110, generating a check response which contains content identification information for identifying a content stored in the storage unit 130 and content relevant information relevant to the content. The check response is transmitted to the information processing device 200 by the transmitting unit 140.

The information providing device 100 may further include an acquisition unit 123. The acquisition unit 123 has a function of, as a response to an acquisition request received by the receiving unit 110, acquiring an operation list (first operation specific information) of the content identified by the content identification information contained in the acquisition request from the storage unit 130 and generating an acquisition response which contains the acquired operation list. The acquisition response is transmitted to the information processing device 200 by the transmitting unit 140.

The information providing device 100 may further include a received information determination unit 121. The received information determination unit 121 has a function of determining the information received by the receiving unit 110. For example, when the information received by the receiving unit 110 contains information for identifying the acquisition request, the received information determination unit 121 determines that the information received by the receiving unit 110 is the acquisition request and outputs the request to the acquisition unit 123. Further, when the information received by the receiving unit 110 contains information for identifying the check request, for example, the received information determination unit 121 determines that the information received by the receiving unit 110 is the check request and outputs the request to the acquisition unit 123. Furthermore, when the information received by the receiving unit 110 contains information for identifying the execution request, for example, the received information determination unit 121 determines that the information received by the receiving unit 110 is the execution request and outputs the request to the execution unit 124.

The control unit 120 that includes the received information determination unit 121, the checking unit 122, the acquisition unit 123, the execution unit 124 and so on may be a CPU, RAM or the like, for example, and its functions are implemented by the CPU loading a program stored in the storage unit 130 (or other non-transitory computer-readable storage medium) to the RAM and executing the program. However, the configuration is not limited thereto, and some of the received information determination unit 121, the checking unit 122, the acquisition unit 123, and the execution unit 124 may be implemented by dedicated hardware. The storage unit 130 may further store various data to be used for execution of a program by the CPU.

1-7. Functional Configuration of Information Processing Device

Figure 7:
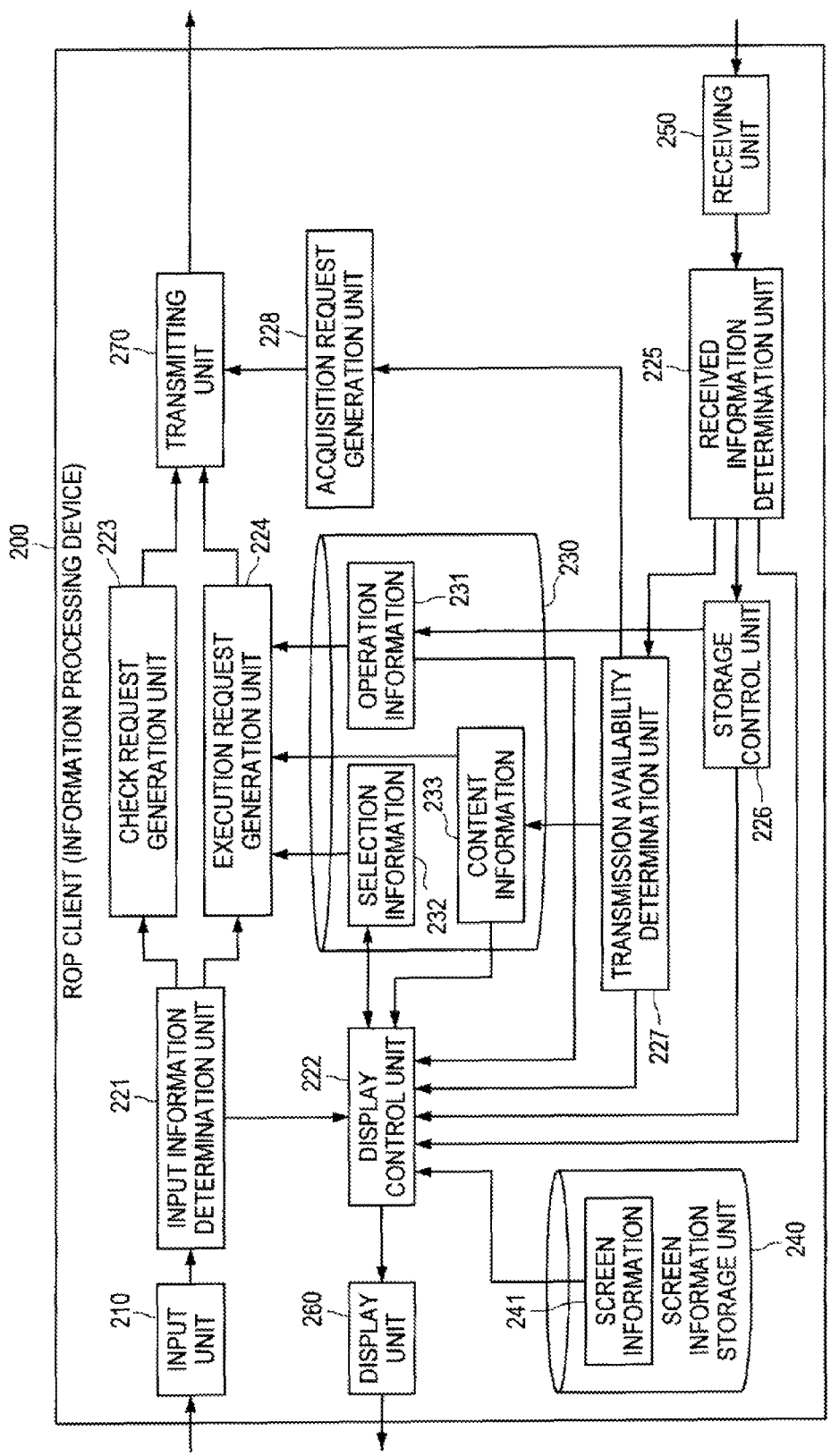
FIG. 7 is a view showing a functional configuration of an information processing device according to the embodiment.

FIG. 7 is a view showing a functional configuration of an information processing device according to the embodiment. The information processing device 200 at least includes a receiving unit 250, a data storage unit 230, a storage control unit 226, a screen information storage unit 240, and a display control unit 222.

The receiving unit 250 has a function of receiving the first operation specific information indicating a specific detail of the first operation to be executed by the information providing device 100 from the information providing device 100. The first operation specific information is contained in the acquisition request and received from the information providing device 100. In the above example, the first operation is the operation that saves a content to favorites, the operation that changes the rate of a content or the like, and the first operation specific information is a character string "favorites", "rate" or the like. The receiving unit 250 may be a communication device, for example, and serves as a communication interface with the information providing device 100.

The data storage unit 230 has a function of storing the second operation specific information indicating a specific detail of the second operation to be executed by the information providing device 100. In the above example, the second operation is the operation that plays a content, the operation that displays detail information of a content or the like, and the second operation specific information is a character string "play", "detail information" or the like. The data storage unit 230 may be a storage device such as HDD or semiconductor memory, for example.

The storage control unit 226 has a function of controlling storing of the first operation specific information received by the receiving unit 250 into the data storage unit 230. The first operation specific information is stored into the data storage unit 230 by control of the storage control unit 226 as information constituting operation information 231, for example. The second operation specific information is already stored in the data storage unit 230 as information constituting the operation information 231, for example.

The screen information storage unit 240 has a function of storing screen information 241, which is information to be used for creating a screen. The screen information 241 is information indicating a position of each information to be displayed in the screen, for example. As a matter of course, the screen information 241 contains information indicating a position of operation specific information indicating a specific detail of an operation in the screen.

The display control unit 222 has a function of creating a screen to which the first operation specific information and the second operation specific information stored in the data storage unit 230 based on the screen information 241 stored in the screen information storage unit 240 and displaying the screen on the display unit 260. A result that the display control unit 222 displays the character strings "favorites" and "rate" as the first operation specific information on the display unit 260 and the character strings "play" and "detail information" as the second operation specific information on the display unit 260 based on the screen information 241 stored in the screen information storage unit 240 is displayed like the screen G22 shown in FIG. 4.

Note that, although the display unit 260 is included in the information processing device 200 in this example, the display unit 260 may be outside the information processing device 200. The display unit 260 may be a display device, for example.

The receiving unit 250 may further receive the first operation identification information for identifying the first operation from the information providing device 100. In this case, the data storage unit 230 further stores the second operation identification information for identifying the second operation, and the storage control unit 226 may further control storing of the first operation identification information received by the receiving unit 250 into the data storage unit 230. The first operation identification information is stored into the data storage unit 230 as information constituting the operation information 231 in association with the first operation specific information by the storage control unit 226, for example. The second operation specific information is stored into the data storage unit 230 as information constituting the operation information 231 in association with the second operation specific information, for example.

Further, in this case, the information processing device 200 may further include an execution request generation unit 224 and a transmitting unit 270. The execution request generation unit 224 selects any one of the first operation identification information and the second operation identification information stored in the data storage unit 230 as selected operation identification information and generates the execution request which contains the selected operation identification information. Specifically, the execution request generation unit 224 uses the operation identification information selected by selection information 232 as the selected operation identification information. Further, the execution request generation unit 224 may generate the execution request which further contains the content identification information selected by the selection information 232. The format of the execution request is not particularly limited.

The transmitting unit 270 has a function of transmitting the execution request generated by the execution request generation unit 224 to the information providing device 100. The transmitting unit 270 may be a communication device, for example, and serves as a communication interface with the information providing device 100.

In the example shown in FIG. 4, the first operation identification information is information for identifying processing to save a content favorites, information for identifying an operation to change the rate of a content or the like. The second operation identification information is information for identifying an operation to play a content, information for identifying an operation to display detail information of a content or the like. Thus, in the example shown in FIG. 4, a case can occur where the first operation identification information and the second operation identification information match each other. In such a case, displaying both the first operation specific information and the second operation specific information can cause confusion to a user.

Therefore, the display control unit 222 may determine whether the first operation identification information and the second operation identification information stored in the data storage unit 230 match each other or not, and, when it determines that the first operation identification information and the second operation identification information match, omit setting of either one of the first operation specific information or the second operation specific information to the screen, for example. This prevents that the first operation specific information and the second operation specific information are both displayed, thereby reducing the possibility of bringing confusion to a user.

Various techniques may be used to select one of the first operation specific information and the second operation specific information as the operation specific information which is omitted to be set to the screen. However, considering that the information processing device 200 stores the second operation specific information in advance, the display control unit 222 may omit setting of the first operation specific information to the screen when it is determined that the first operation identification information and the second operation identification information match.

The execution request generation unit 224 may exclude the first operation identification information from information to be selected in the case where setting of the first operation specific information to the screen is omitted, and exclude the second operation identification information from information to be selected in the case where setting of the second operation specific information to the screen is omitted. The execution request generation unit 224 is thereby unable to select the operation identification information corresponding to the operation specific information which is omitted to be set to the screen by the display control unit 222, which enables further reduction of the possibility that confusion is brought to a user.

When the first operation identification information contains a first function name, which is a function for causing the information providing device 100 to execute the first operation, and the second operation identification information contains a second function name, which is a function for causing the information providing device 100 to execute the second operation, the display control unit 222 may determine whether the first function name and the second function name match each other. The display control unit 222 may determine whether the first operation identification information and the second operation identification information match or not based on the determination, for example. Specifically, the display control unit 222 may determine that the first operation identification information and the second operation identification information match when the first function name and the second function name match, and determine that the first operation identification information and the second operation identification information do not match when the first function name and the second function name do not match.

The display control unit 222 may further determine whether an argument to the first function and an argument to the second function match each other in addition to determining whether the first function name and the second function name match each other. Based on the determination, the display control unit 222 may determine whether the first operation identification information and the second operation identification information match or not. Specifically, the display control unit 222 may determine that the first operation identification information and the second operation identification information match when the argument to the first function and the argument to the second function match in addition to that the first function name and the second function name match, and may determine that the first operation identification information and the second operation identification information do not match when the argument to the first function and the argument to the second function do not match while the first function name and the second function name match. This is described in further detail later with reference to FIGS. 34 and 35.

The receiving unit 250 may further have a function of receiving an execution response which contains an execution result obtained as a result that the information providing device 100 executes the operation identified by the selected operation identification information contained in the execution request as a response to the execution request. In this case, the display control unit 222 may display the execution result contained in the execution response received by the receiving unit 250 on the display unit 260. FIG. 4 shows an example in which the execution result "saved to favorites" is displayed on the screen G24 of the display unit 260 by the display control unit 222.

When a type is added to a message contained in the execution result, the display control unit 222 may display the message in a display format according to the type on the display unit 260. This is further described later with reference to FIGS. 36 and 37.

The receiving unit 110 may further receive transmission availability information indicating whether the first operation specific information is transmittable to the information processing device 200 by the information providing device 100 from the information providing device 100. In this case, the information processing device 200 may further include a transmission availability determination unit 227 that determines whether the transmission availability information received by the receiving unit 250 indicates that the first operation specific information is transmittable to the information processing device 200 by the information providing device 100, and an acquisition request generation unit 228 that generates an acquisition request for acquiring the first operation specific information when the transmission availability determination unit 227 determines that the transmission availability information indicates that the first operation specific information is transmittable.

In this case, the transmitting unit 270 may transmit the acquisition request generated by the acquisition request generation unit 228 to the information providing device 100, and the receiving unit 250 may receive the first operation specific information from the information providing device 100 as a response to the acquisition request.

The information processing device 200 may further include a check request generation unit 223 that generates a check request for acquiring content identification information for identifying a content held by the information providing device 100 and content relevant information relevant to the content. In this case, the transmitting unit 270 transmits the check request generated by the check request generation unit 223 to the information providing device 100, and the receiving unit 250 receives the content identification information and the content relevant information from the information providing device 100 as a response to the check request.

When the content relevant information received by the receiving unit 250 contains the transmission availability information indicating whether the first operation specific information indicating the first operation to be executed for a content is transmittable to the information processing device 200 by the information providing device 100, the transmission availability determination unit 227 acquires the transmission availability information from the content relevant information and determines whether the acquired transmission availability information indicates that the first operation specific information is transmittable to the information processing device 200 by the information providing device 100. The transmission availability determination unit 227 may store the content relevant information received by the receiving unit 250 as content information 233. It is assumed that the content relevant information contains a content list including content identification information or the like and metadata including transmission availability information or the like, for example, and the content relevant information can be used later once it is stored as the content information 233.

The acquisition request generation unit 228 generates an acquisition request containing content identification information when the transmission availability determination unit 227 determines that the transmission availability information indicates that the first operation specific information is transmittable. The transmitting unit 270 transmits the acquisition request generated by the acquisition request generation unit 228 to the information providing device 100, and the receiving unit 250 receives the first operation specific information indicating a specific detail of the first operation to be executed for the content identified by the content identification information contained in the check request from the information providing device 100 as a response to the acquisition request.

When the input information determination unit 221 determines that information input by a user through the input unit 210 is information designating transmission of the check request, the input information determination unit 221 outputs the information designating transmission of the check request to the acquisition request generation unit 228. Further, when the input information determination unit 221 determines that information input by a user through the input unit 210 is information designating transmission of the execution request, the input information determination unit 221 outputs the information designating transmission of the execution request to the execution request generation unit 224. When the input information determination unit 221 determines that information input by a user through the input unit 210 is information designating a change of the selection information 232, the input information determination unit 221 outputs the information designating a change of the selection information 232 to the display control unit 222.

The display control unit 222 updates the selection information 232 based on the information designating a change of the selection information 232 input from the input information determination unit 221. The selection information 232 is information for selecting a combination of the content identification information and the operation identification information constituting the operation information 231.

The information processing device 200 may include a received information determination unit 225. The received information determination unit 225 has a function of determining information received by the receiving unit 250. For example, when the information received by the receiving unit 250 contains information for identifying the acquisition response, the received information determination unit 225 determines that the information received by the receiving unit 250 is the acquisition response and outputs the response to the storage control unit 226. Further, when the information received by the receiving unit 250 contains information for identifying the check response, for example, the received information determination unit 225 determines that the information received by the receiving unit 250 is the check response and outputs the response to the transmission availability determination unit 227. Further, when the information received by the receiving unit 250 contains information for identifying the execution response, for example, the received information determination unit 225 determines that the information received by the receiving unit 250 is the execution response and outputs the response to the display control unit 222.

Each of the input information determination unit 221, the display control unit 222, the check request generation unit 223, the execution request generation unit 224, the received information determination unit 225, the storage control unit 226, the transmission availability determination unit 227 and the acquisition request generation unit 228 may be a CPU, RAM or the like, for example, and its functions are implemented by the CPU loading a program stored in the data storage unit 230 (or other non-transitory computer-readable storage medium) to the RAM and executing the program. However, the configuration is not limited thereto, and some of the input information determination unit 221, the display control unit 222, the check request generation unit 223, the execution request generation unit 224, the received information determination unit 225, the storage control unit 226, the transmission availability determination unit 227 and the acquisition request generation unit 228 may be implemented by dedicated hardware. The data storage unit 230 may further store various data to be used for execution of a program by the CPU.

1-8. Meaning of Menu Item Transmitted from Information Providing Device

FIG. 8 is a view showing meaning of menu items transmitted from the information providing device according to the embodiment with respect to each use case. Referring to FIG. 8, as a use case to which the information processing device 200 according to an embodiment is applied, a content operation and a media operation are assumed principally.

The content operation displays menu items of a selected content when, in the case where the information processing device 200 is DMP or DMC, and the information providing device 100 is DMS, the information processing device 200 selects the content of CDS held by the information providing device 100 and detects pressing of an option button. The example shown in FIG. 4 corresponds to it.

The media operation displays menu items of a content set to the information providing device 100 when, in the case where the information processing device 200 is DMC, and the information providing device 100 is DMR, the information processing device 200 detects pressing of an option button.

The menu item transmitted from the information providing device according to the embodiment is also applicable to a device configuration menu (network configuration etc.), a menu automatically displayed at the start of playing a content (a menu prompting input of whether or not to agree with regulation etc.), a menu automatically displayed at the end of playing a content (a menu prompting input of whether or not to make recommendations to a friend) or the like.

Further, because it takes specification development costs and design and implementation costs to make over a part, which can be used in common, for each use case, it may be preferable in some embodiments to prepare common definition which can be used in common among different use cases. Operation List, Action Directive, Result Document or the like, which is described later, is an example of the common definition. Such common definition may be prepared in advance, and only a way of acquisition and a way of setting (network API etc.) for the common definition may be defined for each use case.

By defining API for acquisition and setting of such common definition for a protocol different from DLNA, scenes in which ROP is available can increase. For example, an AV/C command may be defined in addition to enable use for IEEE 1394.

1-9. Command Executed by Information Processing Device

FIG. 9 is a view showing commands executed by the information processing device according to the embodiment with respect to each use case. The use cases are as shown in FIG. 8. The commands executed by the information processing device correspond to the commands described above with reference to FIG. 5.

1-10. Operation Type Indicating Whether Extended Definition is Used

FIG. 10 is a view to explain an operation type indicating whether an extended definition of a remote operation according to the embodiment is used or not. In the case where the operation type is common, regulation is made for a required part for the information processing device 200 compatible with ROP. Further, in addition, an operation containing more sophisticated UI transition such as BIVL (Bravia Internet Video Link) may be defined extensionally. BIVL is a type of the service in which a server provides contents to a television through the Internet.

For example, when checking compatibility with remote operation, by introducing the concept of the operation type, it is possible to discriminate whether extended definition is used or not. For example, the operation type as shown in FIG. 10 may be defined.

Although a variety of schemes may occur for "result information" and "operation list", if it is required that all clients can translate all the schemes, the schemes which are hardly used are unnecessarily implemented for all combinations of equipment, which increases costs. Therefore, only the schemes required to be compatible (translatable), among various schemes, are defined (common type). Of the other schemes, schemes necessary for a certain use case (a use case to link up contents of BIVL etc.) are put together into a profile (e.g. bivl type). For the latter optional profile, the server makes it clear to the client which profile needs to be supported to translate the ROP which it intends to provide. For example, a value of "av:msOpList" tag or the like may be used.

1-11. Property Necessary to Support Each Use Case

FIG. 11 is a view showing whether each property is necessary to support each use case to which the information processing system according to the embodiment is applied. In FIG. 11, R indicates that the property is required to support the use case.

1-12. Command Necessary to Support Each Use Case

FIG. 12 is a view showing whether each command is necessary to support each use case to which the information processing system according to the embodiment is applied. As described above, the DMS is the ROP server in the use case "Content Operation". The DMP, DMC or the like that refers to the DMS serves as the ROP client.

When the DMP or the like makes UI display of an operation menu at the selection of a content, use of the remote operation enables addition of the operation list provided by the DMS to the operation menu. According to the DLNA, the DMS provides the content list in the DIDL-Lite XML document. The metadata of the content is provided as the property (XML element attribute) included in the CDS object indicating the content. Note that "av:msOpList" may be added as the property to the object which can provide the operation list according to an embodiment.

The operation list XML document can be obtained by issuing "CDS::X_GetOperationList action" with designation of CDS object ID (@id) of the CDS object having "av:msOpList". The information processing device 200 can add the operation corresponding to the CDS object to the UI by translating the operation list.

When a user performs an operation included in the operation list, "CDS::X_ExecuteOperation action" is issued by designating "Action Directive" of the operation. "Action Directive" is described in the operation list document. "Result Argument" of "response" of "X_ExecuteOperation action" contains information necessary for UI after execution, such as a character string for an error message.

As described earlier, in the use case "Media Operation", the DMR servers as the ROP server. A push controller, DMC or the like which refers to the DMR serves as the ROP client. When the DMC or the like makes UI display of the operation menu of the content set to the DMR, use of the remote operation enables addition of the operation list provided by the DMR to the operation menu.

According to the DLNA, the metadata of the content to which the DMR is set is provided in the DIDL-Lite XML document with use of "AVT::GetPositionInfo" or the like. When he operation list according to the embodiment can be provided, "av:mrOpList" may be added to the document. When "AVT::X_GetOperationList action" is issued with designation of instance ID of AVT Instance having "av:mrOpList", the operation list XML document can be obtained. The information processing device 200 can add the operation to the UI by translating the operation list.

When a user performs an operation included in the operation list, "AVT::X_ExecuteOperation action" is issued by designating "Action Directive" of the operation. "Action Directive" is described in the operation list document. "Result Argument" of "response" of "X_ExecuteOperation action" contains information necessary for UI after execution, such as a character string for an error message.

1-13. Each Property Used in Information Processing System

FIG. 13 is a view to explain each property used in the information processing system according to the embodiment. Description as shown in FIG. 13 is added to the property placed in the object in the DIDL-Lite XML document. For example, "urn:schemas-sony-com:av" may be used as a namespace, and "av" may be used as a namespace prefix.

1-14. Variable Used in Information Processing System

FIG. 14 is a view to explain each variable used in the information processing system according to the embodiment. Variables which do not begin with "X_" are not shown in FIG. 14 because it has the same definition as State Variable of the same name of UPnP AV CDS/AVT. "CDS/AVT:X_A_ARG_TYPE_OperationList" includes the XML-escaped Operation List document. "X_A_ARG_TYPE_ActionDirective" includes "Action Directive" indicating which operation or parameter is selected. "X_A_ARG_TYPE_ROPResult" includes the XML-escaped Result document.

1-15. Command Used in Information Processing System

FIG. 15 is a view to explain each command used in the information processing system according to the embodiment. The "CDS:X_GetOperationList" action returns the operation list corresponding to the designated CDS object ID. The "CDS:X_GetOperationList" action returns 701 when the designated object ID does not exist and returns 805 when the corresponding object does not have the operation list.

The "CDS:X_ExecuteOperation" action executes the operation corresponding to "ActionDirective" of the operation list with the designated object ID. An execution result of "CDS:X_ExecuteOperation" action is returned as "Result". When "result information" is not contained, "Result Argument" may be empty.

Further, by the "CDS:X_ExecuteOperation" action, a CDS update ID of the object at the returned time is also returned. The CDS update ID is handled in the same manner as the update ID when checking with Browse( ). When the update ID has changed, the ROP client may determine that the configuration of the object has changed as a result of the operation (or at that timing by coincidence).

The "CDS:X_ExecuteOperation" action returns 701 when the designated object ID does not exist and returns 805 when the corresponding object does not have the operation list. Further, it returns 806 when the content of the designated "ActionDirective" does not match the content of the operation list and is irrelevant.

The "AVT:X_GetOperationList" action returns the operation list corresponding to the content set to the designated AVT instance ID. The "AVT:X_GetOperationList" action returns 718 when the designated AVT instance ID does not exist and returns 805 when there is no corresponding operation list.

The "AVT:X_ExecuteOperation" action executes the operation corresponding to "ActionDirective" of the operation list of the designated AVT instance ID. An execution result of the "AVT:X_ExecuteOperation" action is returned as "Result". When "result information" is not contained, "Result Argument" may be empty.

The "AVT:X_ExecuteOperation" action returns 718 when the designated AVT instance ID does not exist and returns 805 when there is no corresponding operation list. When the content of the designated "ActionDirective" does not match the content of the operation list and is irrelevant, it returns 806.

Even when the list of contents is changed as a result of the ROP, because the client does not understand the semantics of the ROP, the old list may remain displayed. However, it is wasteful in terms of communication cost and screen display transition time to update the list each time. Therefore, when the contents list is changed by ROP process or by coincidence, the value of the update ID may be incremented to prompt the client to update display of the contents list. This is the same as the scheme of the update ID in CDS:Browse. This enables the client to become aware that the list is obsolete when the update ED changes between the fourth and fifth time in the course of browsing the list having many contents to view ten contents each, for example, and start the browsing over again.

1-16. Argument and Returned Value of First Command

FIG. 16 is a view to explain an argument and a returned value of a command (first command) used in the information processing system according to the embodiment. The first command is "CDS:X_GetOperationList" shown in FIG. 15.

1-17. Type of Returned Value of First Command

FIG. 17 is a view to explain types of the returned value of the command (first command) used in the information processing system according to the embodiment. The first command is "CDS:X_GetOperationList" shown in FIG. 15.

1-18. Argument and Returned Value of Second Command

FIG. 18 is a view to explain an argument and a returned value of a command (second command) used in the information processing system according to the embodiment. The second command is "CDS:X_ExecuteOperation" shown in FIG. 15.

1-19. Type of Returned Value of Second Command

FIG. 19 is a view to explain types of the returned value of the command (second command) used in the information processing system according to the embodiment. The second command is "CDS:X_ExecuteOperation" shown in FIG. 15.

1-20. Argument and Returned Value of Third Command

FIG. 20 is a view to explain an argument and a returned value of a command (third command) used in the information processing system according to the embodiment. The third command is "AVT:X_GetOperationList" shown in FIG. 15.

1-21. Type of Returned Value of Third Command

FIG. 21 is a view to explain types of the returned value of the command (third command) used in the information processing system according to the embodiment. The third command is "AVT:X_GetOperationList" shown in FIG. 15.

1-22. Argument and Returned Value of Fourth Command

FIG. 22 is a view to explain an argument and a returned value of a command (fourth command) used in the information processing system according to the embodiment. The fourth command is "AVT:X_ExecuteOperation" shown in FIG. 15.

1-23. Type of Returned Value of Fourth Command

FIG. 23 is a view to explain types of the returned value of the command (fourth command) used in the information processing system according to the embodiment. The fourth command is "AVT:X_ExecuteOperation" shown in FIG. 15.

1-24. Example of Description of Acquisition Response

FIG. 24 is a view showing an example of description of an acquisition response transmitted by the information providing device according to the embodiment. "Elements" and "Attributes" of the description example D11 are described hereinbelow. In the oplist is root tag, namespace declaration (xmlns= . . . ) of the operation list document. As the namespace, "urn:schemas-sony-com:av:ropoplist" is used. The oplist has one or more <operation> as a child element.

<operation> indicates a single operation. The number of <operation> is 16 or less. <operation@type> represents a type of the operation. Omission is possible only when operation@type is "common type". <displayString> is required and indicates a display character string when making UI display of the operation or parameter. <displayString> is within 256 bytes.

<shortDisplayString> is required when the character string length of <displayString> is greater than 32 bytes in the case of "common type". When the character string length of <displayString> is 32 bytes or less, it is optional. <shortDisplayString> is a display character string when making UI display of the operation or parameter, and it is used instead of <displayString> by equipment having only a short display area. <shortDisplayString> is within 32 bytes.

<selected> is optional. It indicates that, when making UI display of the list, the operation or parameter should be selected by default. <selected> is placed in one or less operation in the operation list. When <selected> is placed for the parameter, it is placed in one or less parameter in the parameter list with respect to each operation.

<confirm> is optional, and it indicates whether or not to reconfirm execution when the operation or parameter is selected. A way of reconfirmation is not limited. <iconUrl> is optional, and it indicates URL to acquire an icon representing the operation or parameter. <iconUrl@profile> is required when <iconUrl> is present. <iconUrl@profile> indicates the format of the icon. At present, the format of the icon conforms to the DLNA JPEG_TN profile, and therefore the value of <iconUrl@profile> is "JPEG_TN", for example.

<action> is required when <paramerterList> is not present in <operation> and banned when it is present. <action> is required for <paramerter>, and action directive to be used for execution of the operation or parameter is described in <action>. When <action@ropOnly> is "1", it indicates that the description of the action directive is not parsible by the ROP client. When <action@ropOnly> is "0", it indicates that omission is possible.

<parameterList> is required when <action> is not present in <operation> and banned when it is present. <parameterList> indicates a list of parameters (sub-choices) relevant to the operation. <parameterList> has one or more <parameter> as child elements. <parameter> indicates a single parameter. The number of <parameter> is 16 or less.

When there is no <shortDisplayString>, all equipment are necessary to use a menu item name designed with a short character string for mobile use or an item name is displayed only partially in mobiles. When there is no <selected>, the client is unable to determine which choice should be default. A client application can grasp the name of the item but not its meaning, and if it is designed to be able to grasp the meaning, additional implementation is needed for the client when a new function is added to the server. When there is no <confirm>, the client is unable to recognize which item needs reconfirmation. If reconfirmation is made for all items as another technique, there is an inadequate case and UX is thereby degraded. Thus, it is necessary to use some scheme to improve user-friendliness of a set item whose meaning is ungraspable for the client application.

1-25. Example of Description and Example of Display of Acquisition Response

FIG. 25 is a view showing an example of description and an example of display of an acquisition response transmitted by the information processing device according to the embodiment. An operation list contained in the acquisition response described like a description example D12 is displayed like a screen G3. However, the structural definition of the operation list shown in FIG. 25 is just by way of illustration. For example, the structural definition may be more complicated. For example, the depth of the hierarchy may be increased, not limited to the two-level hierarchy. Further, a request for a character input form may be made, for example. Such extension may be applied in the future profile other than common and bivl. Building the schemes like common and bivl allows implementation with no adverse effect on equipment supporting only common and bivl even when extension is applied in the future. The item menu for common and bivl and the item menu for a new type may be separated.

1-26. Example of Description of Execution Request

FIG. 26 is a view showing an example of description of an execution request containing operation identification information selected by the information processing device according to the embodiment. The execution request described like a description example D21 corresponds to "Normative Action Directive" in the following description.

"Action Directive" is a character string acting like an ID which is transmitted to the ROP server when the operation or parameter described in the operation list is selected by a user. There are two kinds of implementation of "Action Directive": a format that is used as it is as an opaque ID without translating its substance and a format that can be used by parsing its substance and understanding its semantics as to what selection of the operation or parameter means. Those formats can be distinguished by an attribute value of ropOnly in the operation list.

In "ROP-Only Action Directive", the ROP client is unable to translate the character string of Action Directive. It is used opaquely as an argument to the operation execution action specified for each use case, such as "CDS::ExecuteOperation( )". The value in this case is ropOnly=1.

"Normative Action Directive" is the XML document which is configured according to the following syntax, and it represents that performing a remote operation with selection of the operation parameter is equivalent to the case where corresponding SOAP Action is executed. The value in this case is ropOnly=0 (or omitted). "Normative Action Directive" is XML-escaped in the operation list.

In the description example D21, <action> is a root tag of Action Directive document. The action element is different from the action element in the operation list, and xml namespace declaration is made. As the namespace, "urn:schemas-sony-com:av:ropactiondirective" is used.

<name> is the name of the corresponding SOAP Action. <arguemntList> is required when there is IN Argument in the SOAP Action. <arguemntList> has one or more <element> respectively representing IN Argument as child elements. In <argument>, an element name is IN Argument name of the SOAP Action, and a value is the element value.

1-27. First Example of Description of Execution Response

FIG. 27 is a view (first view) showing an example of description of an execution response transmitted by the information providing device according to the embodiment. In FIG. 27, the execution response is described as a description example D31. The Result document as described as the description example D31 is the XML document representing what UI transition should be made in the information processing device 200 after execution of the operation. As a child element of the result root element, result information representing zero or more transition information is included.

Currently, the result information specified in the operation list of the common type is only <message>, which represents an UI message text to be displayed as the execution result. For example, the UI message at an error is not SOAP error, and it is performed using the message result information after success of SOAP. Unknown result information is ignored.

1-28. Second Example of Description of Execution Response

FIG. 28 is a view (second view) view showing an example of description of an execution response transmitted by the information providing device according to the embodiment. In FIG. 28, the execution response is described as a description example D32.

1-29. First Example of Application of Information Processing System

Figure 29:
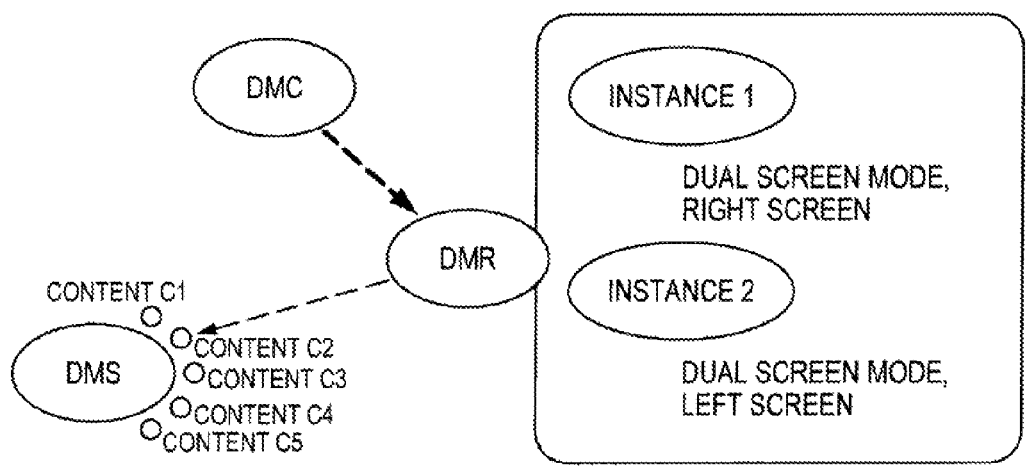
FIG. 29 is a view to explain an example (first example) of application of the information processing system according to the embodiment.

FIG. 29 is a view to explain an example (first example) of application of the information processing system according to the embodiment. As shown in FIG. 29, the DMC may give a play command by setting a content 2 on the DMS to an instance 1 of the DMR, for example.

1-30. Second Example of Application of Information Processing System

Figure 30:
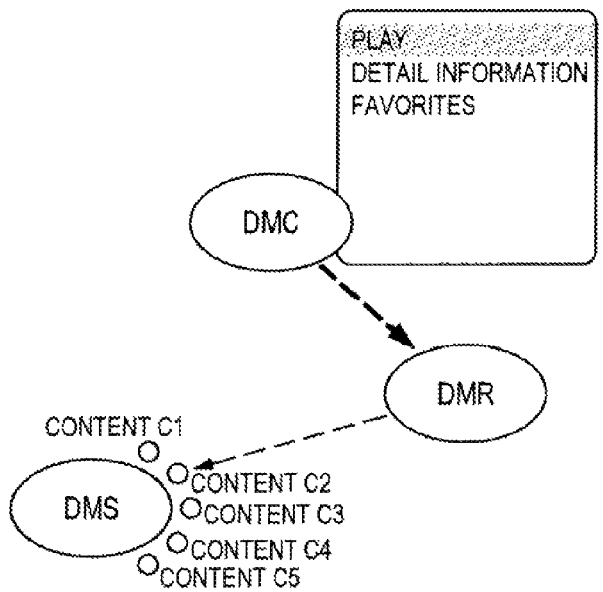
FIG. 30 is a view to explain an example (second example) of application of the information processing system according to the embodiment.

FIG. 30 is a view to explain an example (second example) of application of the information processing system according to the embodiment. As shown in FIG. 30, display may vary depending on the content set to the DMR.

1-31. Information for Specifying Menu Item from Type of Content

FIG. 31 is a view showing information for specifying a menu item to be displayed from types of contents by the information processing device according to the embodiment. The information processing device 200 may store correspondence information between a type of a content and a menu item as shown in FIG. 31 in the data storage unit 230, for example.

1-32. Correspondence Between Menu Item Stored in Information Processing Device and Command FIG. 32 is a view showing information for specifying a command to be executed from menu items prestored in the information processing device according to the embodiment. The information processing device 200 may store correspondence information between a prestored menu item (own menu item) and a command (Network API) as shown in FIG. 32 in the data storage unit 230, for example.

1-33. Correspondence Between Menu Item Transmitted from Information Providing Device and Command FIG. 33 is a view showing information for specifying a command to be executed from menu items transmitted from the information providing device according to the embodiment. The information providing device 100 may store correspondence information between a menu item (ROP menu) transmitted from the information providing device and a command (Network API) as shown in FIG. 33 in the storage unit 130, for example.

The DMP (ROP client) creates an option menu by combining the own menu items and the menu items acquired through the ROP. If items having the same function are contained in the respective menu items, the composite UI becomes unnatural. A first issue is how the DMP detects items with the same function. Translating "Normative Action Directive" of the ROP menu item allows the DMP to grasp to what DLNA API the function of the menu item corresponds. On the other hand, for the own menu, the DMP knows by what DLNA API its item is implemented. The items implemented by the same DLNA API may be determined to have the same function. Thus, either one of those is eliminated from the UI. It is considered to be more effective to leave the own menu because the DMP completely grasps the meaning of the own menu.

1-34. Flow of Process Executed by Information Processing Device

Figure 34:
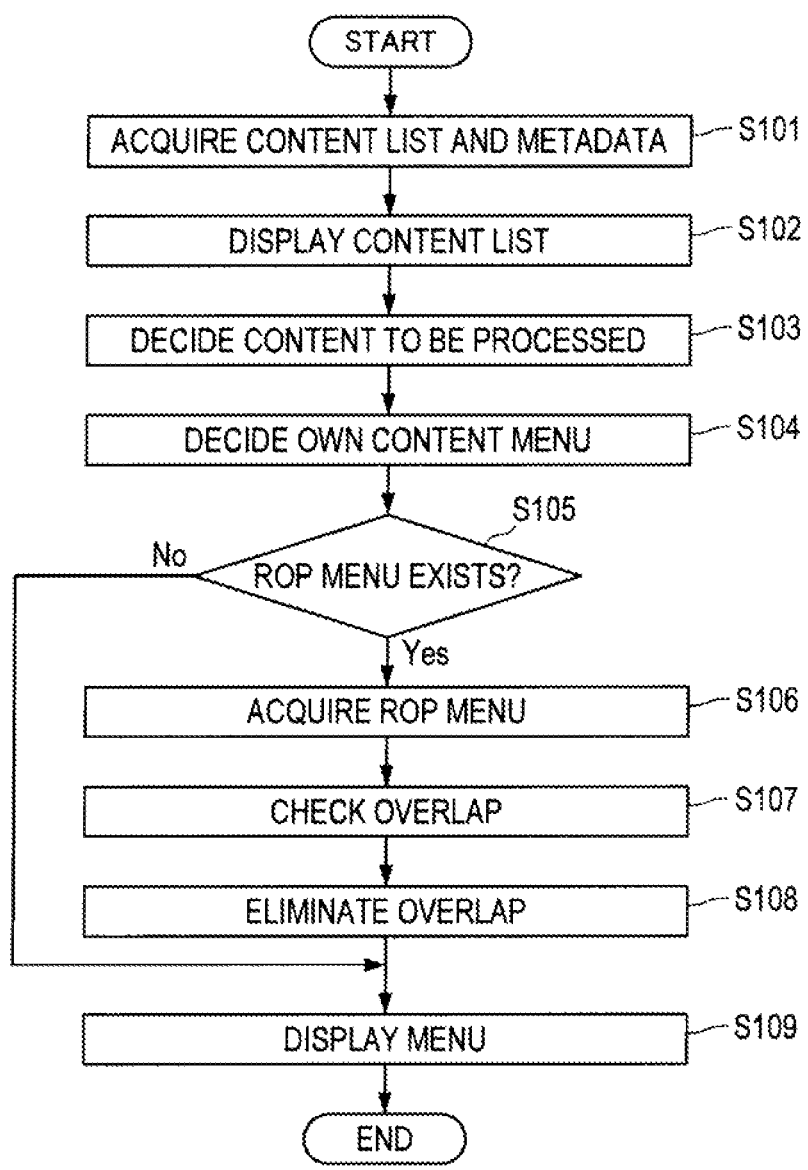
FIG. 34 is a flowchart showing a flow of a process executed by the information processing device according to the embodiment.

FIG. 34 is a flowchart showing a flow of a process executed by the information processing device according to the embodiment. Referring to FIG. 34, the receiving unit 250 of the information processing device 200 acquires a content list and metadata (step S101), and the display unit 260 displays the content list (step S102). DLNA (CDS::Browse) may be used for acquition of the content list and the metadata. Types of contents and titles of contents can be thereby acquired.

The input information determination unit 221 decides a content to be processed (step S103). For example, information for deciding a content to be processed is input through the input unit 210 by a user's operation (e.g. up/down key). The display control unit 222 decides the own content menu (step S104) and determines whether there is ROP menu or not (step S105). Because an available operation can differ depending on the type of the content, for example, the display control unit 222 decides the menu to be displayed based on the correspondence information as shown in FIG. 31. The determination as to whether the ROP menu exists or not can be made by checking whether an element (av:msOpList) indicating that ROP is available exists in the metadata. When the ROP menu does not exist (No in step S105), the display control unit 222 proceeds to the step S109.

When, on the other hand, the ROP menu exists (Yes in step S105), the display control unit 222 acquires the ROP menu (step S106), checks an overlap (step S107), eliminates the overlap (step S108), displays the menu (step S109), and then ends the process. The display control unit 222 may acquire the ROP operation menu by "CDS::X_GetOperationList", for example. Some menu items contain "Normative Action Directive", in which API when implemented with DLNA API is described (cf. FIG. 33).

The display control unit 222 grasps in advance which DLNA API is to be used for implementing the own menu items (cf. FIG. 32). The display control unit 222 searches for an overlap between the API (cf. FIG. 33) of the items obtained by the ROP and the API (cf. FIG. 32) to be used for the items (cf. FIG. 31) prepared on its own for the content. In the example shown in FIGS. 32 and 33, "rating change" of the own menu is synonymous with "rate" of the ROP menu. The step of eliminating an overlap (step S108) eliminates one of the overlapping elements before combining the menu items, and the step of displaying a menu (step S109) obtains the menu to be displayed. The case for music contents in this example is shown in FIG. 35.

1-35. Combination of Menu Items

Figure 35:
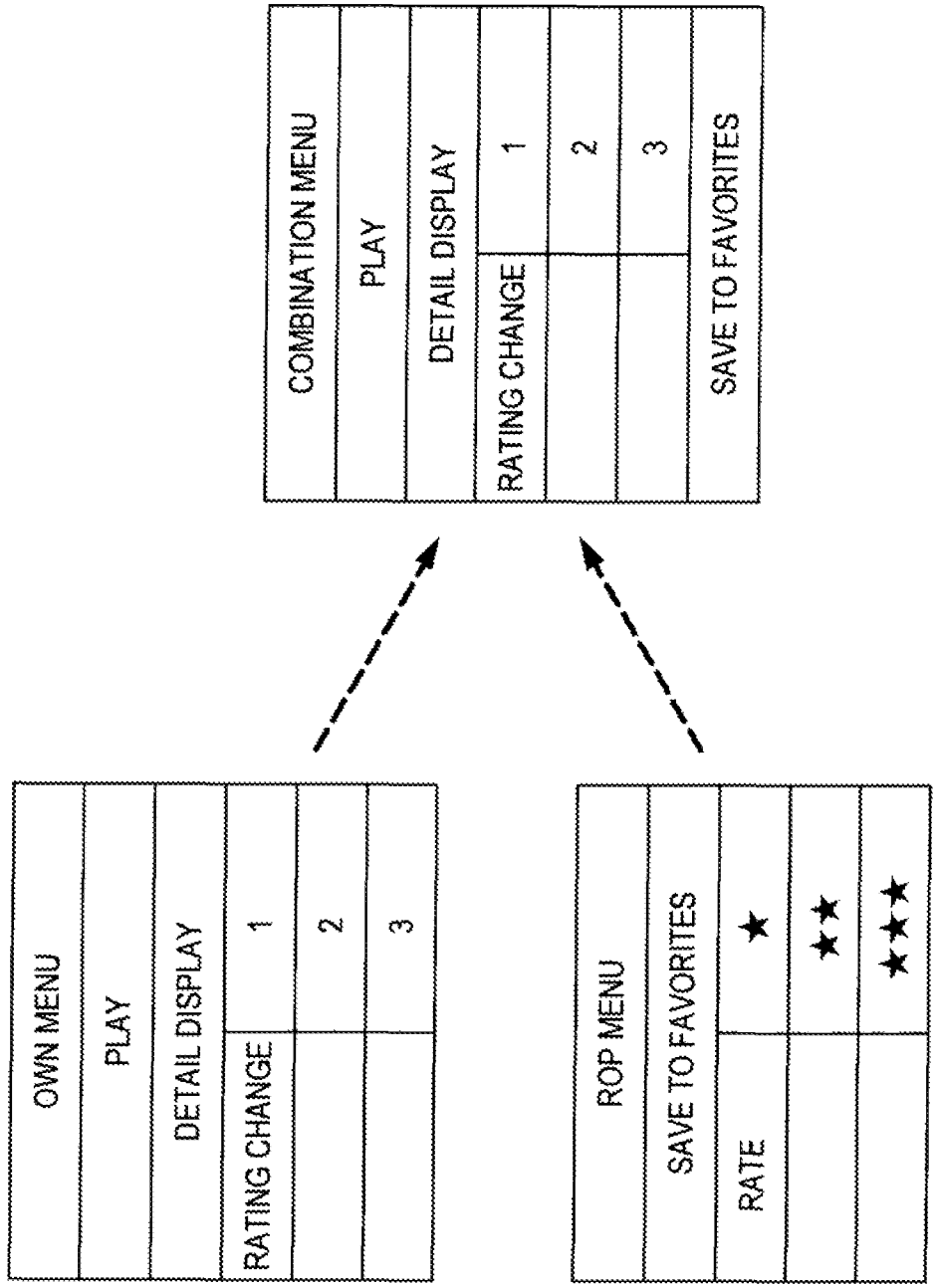
FIG. 35 is a view to explain combination of menu items prestored in the information processing device according to the embodiment and menu items transmitted from the information providing device according to the embodiment.

FIG. 35 is a view to explain combination of menu items prestored in the information processing device according to the embodiment and menu items transmitted from the information providing device according to the embodiment. In the example shown in FIG. 35, "rating change" of the own menu is determined to be synonymous with "rate" of the ROP menu, and "rate" of the ROP menu is eliminated.

1-36. Execution Response Containing Message with Label

FIG. 36 is a view showing an example of description of an execution response containing a message with a label indicating a type of the message. As shown in a description example D41 of FIG. 36, label xml attribute is added to the current format <message>[message text]</message> of "Result information", so that it is described in the format of <message label="1">[message text]</message>.

1-37. Correspondence Between Type of Message and Value of Label

FIG. 37 is a view showing an example of correspondence between a type of a message and a value of a label. "ROP result information message" is used for the ROP server to direct the ROP client to make UI display of the message from the server as the UI transition adequate after execution of the menu by the ROP. The message displayed herein may be "recording succeeded", "saving failed due to too many favorites" or the like, for example.

Note that, "ROP result information message" may be extended so that not only the message text but also a label indicating a type of its meaning can be transmitted in addition to the ROP client. The label may indicate "success", "failure", "warning" or the like, for example. The message without label may indicate general information. The ROP client may make modification according to the label when displaying the message. For example, the way of modification can be decided by the ROP client, such as displaying "recording succeeded" after the mark o or displaying "saving failed" together with a beep sound after the mark x. Further, there may be the ROP client that ignores the labels and handles all messages in the same manner, for example.

2. Alternative Example

Although exemplary embodiments are described in detail above with reference to the appended drawings, the present disclosure is not limited thereto. It should be understood by those skilled in the art that various modifications, combinations, sub-combinations and alterations may occur depending on design requirements and other factors insofar as they are within the scope of the appended claims or the equivalents thereof.

3. Summary

According to the embodiment, it is possible to solve the problem of compatibility between the screen prestored in the information processing device 200 and the screen created by the information providing device 100 and flexibly respond to a change in the protocol used between the information providing device 100 and the information processing device 200.

What is claimed is:

1. An information-processing apparatus for controlling presentation of a menu over a network, the information-processing apparatus comprising:
   a communication unit configured to communicate with an information-providing apparatus over the network;
   an input unit configured to receive input from a user of the information-processing apparatus;
   a storage unit storing one or more menus; and
   a control unit configured to:
   receive, via the input unit, a selection of information for processing;
   retrieve, from the storage unit, a first menu associated with the selected information, wherein the first menu comprises a first one or more menu items associated with functions for processing the selected information;
   receive, via the communication unit from the information-providing apparatus over the network, a second menu associated with the selected information, wherein the second menu comprises a second one or more menu items associated with functions for processing the selected information; and
   generate a third menu associated with the selected information, based on the first menu and on the second menu, wherein generating the third menu comprises:
   identifying menu items of the first one or more menu items that are duplicative of menu items of the second one or more menu items;
   eliminating the identified duplicative menu items from the first one or more menu items or from the second one or more menu items; and
   combining the remaining menu items of the first one or more menu items and the second one or more menu items to generate the third menu.

2. The information-processing apparatus of claim 1, wherein the information-processing apparatus comprises a Digital Media Player (DMP) operating in a Digital Living Network Alliance (DLNA) environment.

3. The information-processing apparatus of claim 1, wherein the information-processing apparatus comprises a Digital Media Controller (DMC) operating in a Digital Living Network Alliance (DLNA) environment.

4. The method of claim 1, wherein the selected information comprises at least one electronic content item stored at the information-providing device.

5. The information-processing apparatus of claim 1, wherein the control unit is further configured to:
   determine whether the information-providing apparatus contains the second menu; and
   request the second menu from the information-providing apparatus only when it is determined that the information-providing apparatus contains the second menu.

6. The information-processing apparatus of claim 1, wherein the control unit is further configured to:
   receive, from the information-providing apparatus over the network, metadata associated with the selected information; and
   determine whether the information providing apparatus contains the second menu based on whether the metadata includes an element indicating that the information-providing apparatus contains the second menu.

7. The information-processing apparatus of claim 1, wherein the control unit is configured to identify the duplicative menu items based on whether the functions associated with the menu items are the same.

8. The information-processing apparatus of claim 1, wherein the control unit is configured to identify the overlapping menu items based on a content directory service (CDS) supported by the information-providing device.

9. The information-processing apparatus of claim 1, wherein:
   the generated third menu includes a plurality of menu items associated with functions for processing the selected information, and
   the control unit is further configured to:
   receive, via the input unit, a selection of a menu item of the third menu;
   responsive to the selection, send, to the information-providing apparatus over the network, a request to execute the function for processing the selected information associated with the selected menu item; and
   receive a result of the execution from the information-providing apparatus over the network.

10. A computer-implemented method for controlling presentation of a menu over a network, the method comprising:
   receiving a selection of information for processing;
   accessing a first menu associated with the selected information, the first menu stored at an information-processing apparatus, wherein the first menu comprises a first one or more menu items associated with functions for processing the selected information;
   receiving, from an information-providing apparatus over the network, a second menu associated with the selected information, wherein the second menu comprises a second one or more menu items associated with functions for processing the selected information; and
   generating a third menu associated with the selected information based on the first menu and on the second menu, wherein generating the third menu comprises:
   identifying menu items of the first one or more menu items that are duplicative of menu items of the second one or more menu items;

eliminating the identified duplicative menu items from the first one or more menu items or from the second one or more menu items; and combining the remaining menu items of the first one or more menu items and the second one or more menu items to generate the third menu.

11. A non-transitory computer-readable storage medium storing instructions which, when executed by an information-processing apparatus, cause the information-processing apparatus to perform a method for controlling presentation of a menu over a network, the method comprising:

receiving a selection of information for processing;

accessing a first menu associated with the selected information, the first menu stored at an information-processing apparatus, wherein the first menu comprises a first one or more menu items associated with functions for processing the selected information;

receiving, from an information-providing apparatus over the network, a second menu associated with the selected information, wherein the second menu comprises a second one or more menu items associated with functions for processing the selected information; and generating a third menu associated with the selected information based on the first menu and on the second menu, wherein generating the third menu comprises:

identifying menu items of the first one or more menu items that are duplicative of menu items of the second one or more menu items;

eliminating the identified duplicative menu items from the first one or more menu items or from the second one or more menu items; and combining the remaining menu items of the first one or more menu items and the second one or more menu items to generate the third menu.

12. An information-providing apparatus for controlling the presentation of a menu over a network, the information-providing apparatus comprising:

a communication unit configured to communicate with an information-processing apparatus over the network;

a storage unit storing one or more menus; and a control unit configured to:

receive, via the communication unit, a selection of information for processing;

retrieve, from the storage unit, a first menu associated with the selected information, wherein the first menu comprises a first one or more menu items associated with functions for processing the selected information, to be combined with a second menu associated with the selected information, the second menu being stored at the information-processing apparatus, wherein the second menu comprises a second one or more menu items associated with functions for processing the selected information; and send, via the communication unit, the retrieved first menu to the information-processing apparatus over the network, wherein the information processing apparatus generates a third menu associated with the selected information by combining the first menu and the second menu, wherein generating the third menu comprises:

identifying menu items of the first one or more menu items that are duplicative of menu items of the second one or more menu items;

eliminating the identified duplicative menu items from the first one or more menu items or from the second one or more menu items; and combining the remaining menu items of the first one or more menu items and the second one or more menu items to generate the third menu.

13. A method for controlling the presentation of a menu over a network, the method comprising:

receiving, at an information-providing apparatus, a selection of information for processing from an information-processing apparatus over the network;

retrieving, from a storage unit at the information-providing apparatus, a first menu associated with the selected information, wherein the first menu comprises a first one or more menu items associated with functions for processing the selected information, to be combined with a second menu associated with the selected information, the second menu being stored at the information-processing apparatus, wherein the second menu comprises a second one or more menu items associated with functions for processing the selected information; and sending the retrieved first menu to the information-processing apparatus over the network, wherein the information processing apparatus generates a third menu associated with the selected information by combining the first menu and the second menu, wherein generating the third menu comprises:

identifying menu items of the first one or more menu items that are duplicative of menu items of the second one or more menu items;

eliminating the identified duplicative menu items from the first one or more menu items or from the second one or more menu items; and combining the remaining menu items of the first one or more menu items and the second one or more menu items to generate the third menu.

14. A non-transitory computer-readable storage medium storing instructions which, when executed by an information-providing apparatus, cause the information-providing apparatus to perform a method for controlling the presentation of a menu over a network, the method comprising:

receiving, at the information-providing apparatus, a selection of information for processing from an information-processing apparatus over the network;

retrieving, from a storage unit at the information-providing apparatus, a first menu associated with the selected information, wherein the first menu comprises a first one or more menu items associated with functions for processing the selected information, to be combined with a second menu associated with the selected information, the second menu being stored at the information-processing apparatus, wherein the second menu comprises a second one or more menu items associated with functions for processing the selected information; and sending the retrieved first menu to the information-processing apparatus over the network, wherein the information processing apparatus generates a third menu associated with the selected information by combining the first menu and the second menu, wherein generating the third menu comprises:

identifying menu items of the first one or more menu items that are duplicative of menu items of the second one or more menu items;

eliminating the identified duplicative menu items from the first one or more menu items or from the second one or more menu items; and combining the remaining menu items of the first one or more menu items and the second one or more menu items to generate the third menu.

* * * * *